US012695696B2

(12) United States Patent
Mouton et al.

(10) Patent No.: US 12,695,696 B2
(45) Date of Patent: Jul. 28, 2026

(54) SYSTEM AND METHOD FOR MAKING EVENT ROUTING DECISIONS BASED ON A STANDARDIZED MESSAGES FORMAT

(71) Applicants: Bernard Behan Mouton, San Rafael, CA (US); Bertrand Mouton, San Rafael, CA (US); Simon Paul Shortman, San Rafael, CA (US)

(72) Inventors: Bernard Behan Mouton, San Rafael, CA (US); Bertrand Mouton, San Rafael, CA (US); Simon Paul Shortman, San Rafael, CA (US)

( * ) Notice: Subject to any disclaimer, the term of this patent is extended or adjusted under 35 U.S.C. 154(b) by 428 days.

(21) Appl. No.: 18/462,819

(22) Filed: Sep. 7, 2023

(65) Prior Publication Data

US 2024/0129230 A1 Apr. 18, 2024

Related U.S. Application Data

(63) Continuation of application No. PCT/US2023/073596, filed on Sep. 7, 2023.
(Continued)

(51) Int. Cl.
| | |
|---|---|
| *H04L 45/00* | (2022.01) |
| *G06F 8/41* | (2018.01) |
| *H04L 45/74* | (2022.01) |

(52) U.S. Cl.
CPC .............. *H04L 45/54* (2013.01); *G06F 8/427* (2013.01); *H04L 45/74* (2013.01)

(58) Field of Classification Search
None
See application file for complete search history.

(56) References Cited

U.S. PATENT DOCUMENTS

| | | | |
|---|---|---|---|
| 7,926,029 B1 * | 4/2011 | Stoyen ...................... | G06F 8/20 |
| | | | 717/102 |
| 8,627,299 B2 * | 1/2014 | Frank ...................... | G06F 9/542 |
| | | | 717/146 |

(Continued)

FOREIGN PATENT DOCUMENTS

WO 03096212 A1 11/2003

OTHER PUBLICATIONS

ISA/US, International Search Report and Written Opinion for International Patent Application No. PCT/US2023/073596, mailed, Dec. 12, 2023, 6 pages.

(Continued)

*Primary Examiner* — Xavier S Wong
(74) *Attorney, Agent, or Firm* — NK Patent Law

(57) ABSTRACT

The subject matter includes an event-based routing system including an Event Router Domain Rules Language Compiler that parses and compiles a Domain Event Router rules file into Event Router rules instructions. An Event Router ingests incoming event data and applies the Event Router rules instructions. An Event Router Management component manages the Event Router, where the Event Router includes a single Event Router or a network of multiple Event Routers. A Domain Registry registers domain definitions and provides the domain definitions to the Event Router Domain Rules Language Compiler and a Domain Endpoint Resolver. The Domain Endpoint Resolver stores IP addresses, ports, and names of domains for which the Event Router receives event data, as well as the domain names of the Event Routers. The event data are formatted in an event message format comprising a tuple of at least: a Domain, an Entity, an Attribute, and a Value.

32 Claims, 33 Drawing Sheets

Related U.S. Application Data

(60) Provisional application No. 63/379,908, filed on Oct. 18, 2022.

(56) References Cited

U.S. PATENT DOCUMENTS

| 11,429,460 B1* | 8/2022 | Freeburg ................ G06F 9/466 |
|---|---|---|
| 2004/0019465 A1* | 1/2004 | Kerr ........................ G06F 9/542 |
| | | 702/189 |
| 2009/0172194 A1* | 7/2009 | Ristock ................... H04L 45/08 |
| | | 709/244 |
| 2011/0286444 A1 | 11/2011 | Petrovykh |
| 2015/0142501 A1* | 5/2015 | Nair ................ G06Q 10/06316 |
| | | 705/7.26 |
| 2020/0097456 A1 | 3/2020 | Tran et al. |
| 2021/0027015 A1* | 1/2021 | Roberts ................ G06F 40/186 |
| 2021/0271522 A1 | 9/2021 | Butterworth et al. |

OTHER PUBLICATIONS

WIPO, International Preliminary Report on Patentability for corresponding PCT Patent Application No. PCT/2023/073596, issued Mar. 1, 2025, 5 pages.

* cited by examiner

Event Centric Integration Pattern

FIG. 2

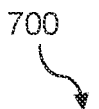
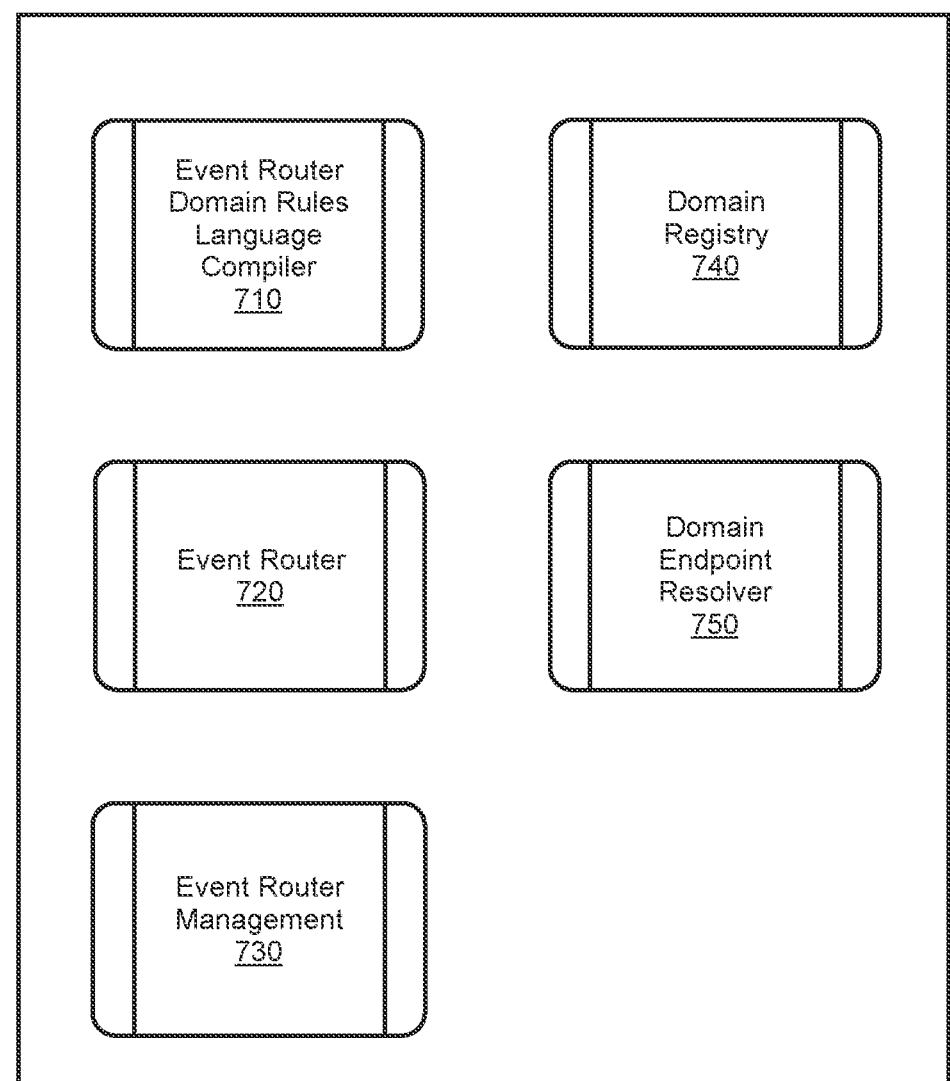
FIG. 7

1000

Read Event Router Domain Rules File
1005

Tokenize Input Text
1010

Parse Tokens
1015

Populate Symbol Table & Construct Abstract
Syntax Tree for Input File
1020

Perform Type Checking
1025

Generate Binary Code Instruction Sets
1030

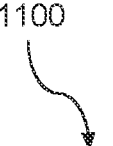
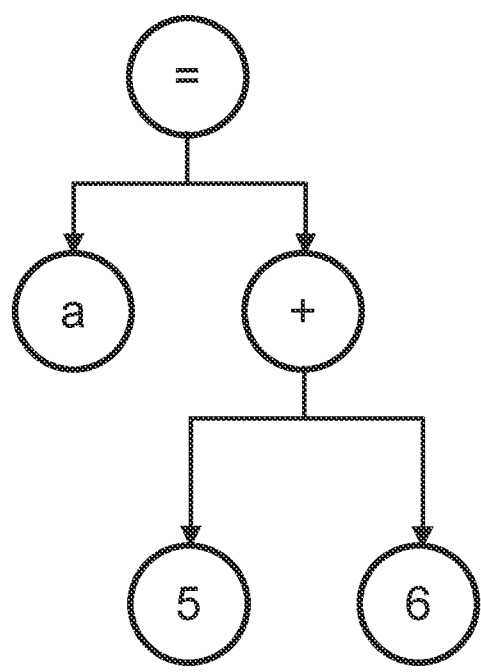
Abstract Syntax Tree for
Expression: a = 5 + 6
FIG. 11

1700

1800
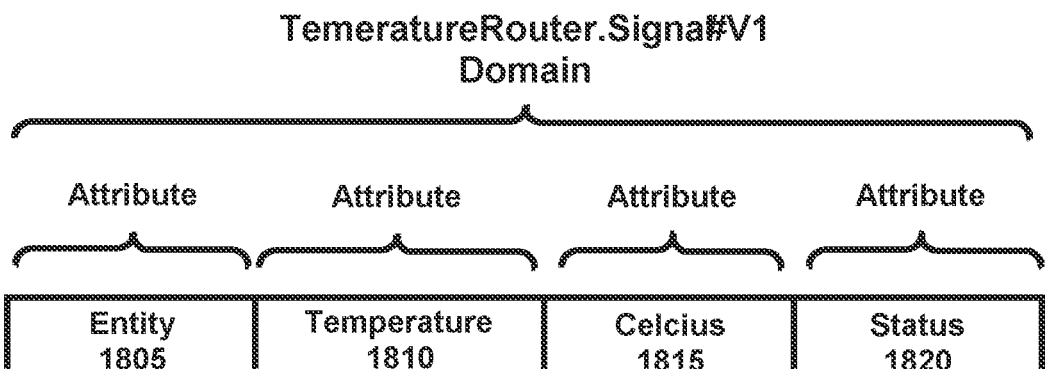
TemeratureRouter.Signal#V1
Domain
| Attribute | Attribute | Attribute | Attribute |
|---|---|---|---|
| Entity 1805 | Temperature 1810 | Celcius 1815 | Status 1820 |
FIG. 18

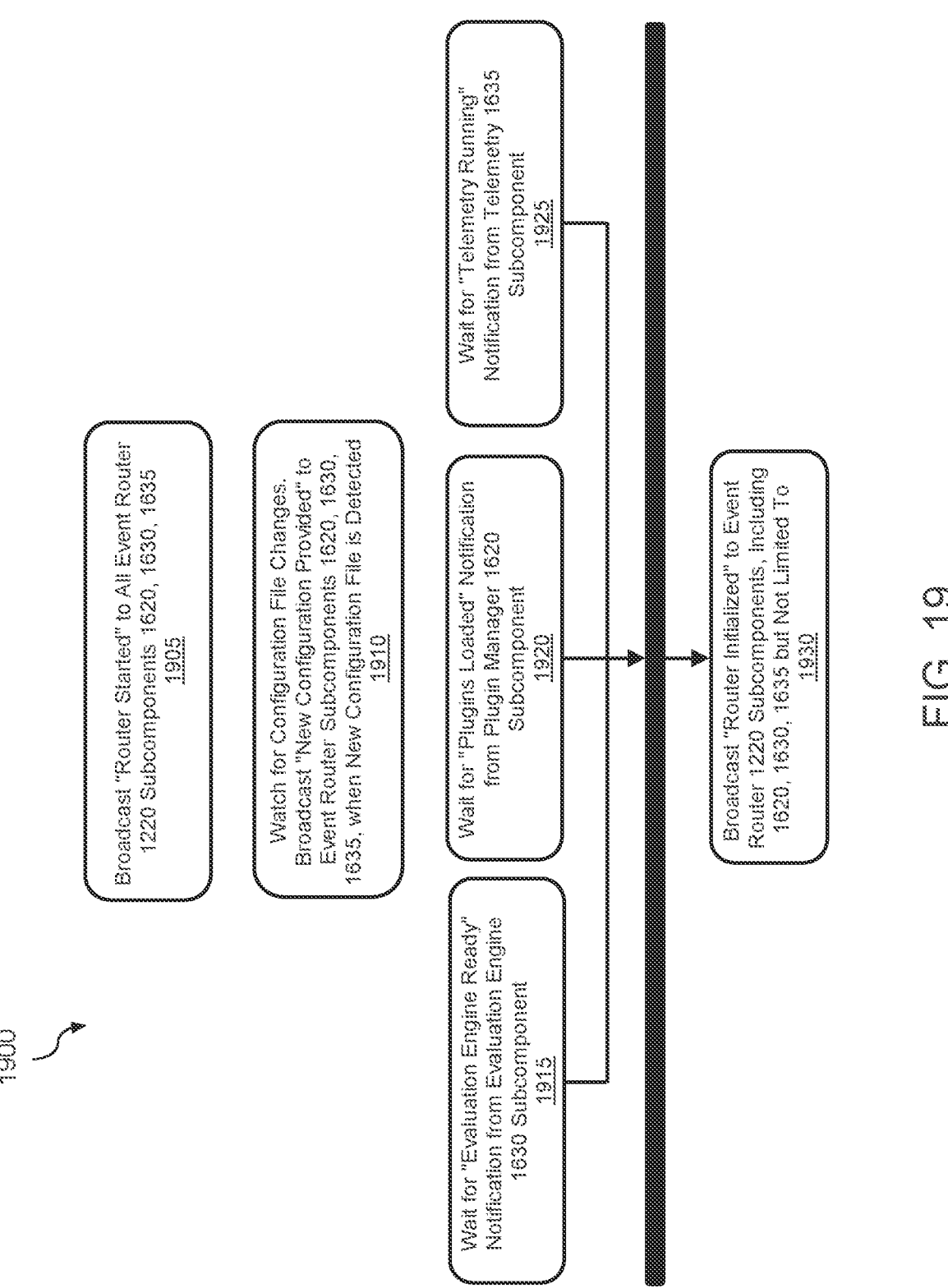

1900

Broadcast "Router Started" to All Event Router 1220 Subcomponents 1620, 1630, 1635
1905

Watch for Configuration File Changes. Broadcast "New Configuration Provided" to Event Router Subcomponents 1620, 1630, 1635, when New Configuration File is Detected
1910

Wait for "Evaluation Engine Ready" Notification from Evaluation Engine 1630 Subcomponent
1915

Wait for "Plugins Loaded" Notification from Plugin Manager 1620 Subcomponent
1920

Wait for "Telemetry Running" Notification from Telemetry 1635 Subcomponent
1925

Broadcast "Router Initialized" to Event Router 1220 Subcomponents, Including 1620, 1630, 1635 but Not Limited To
1930

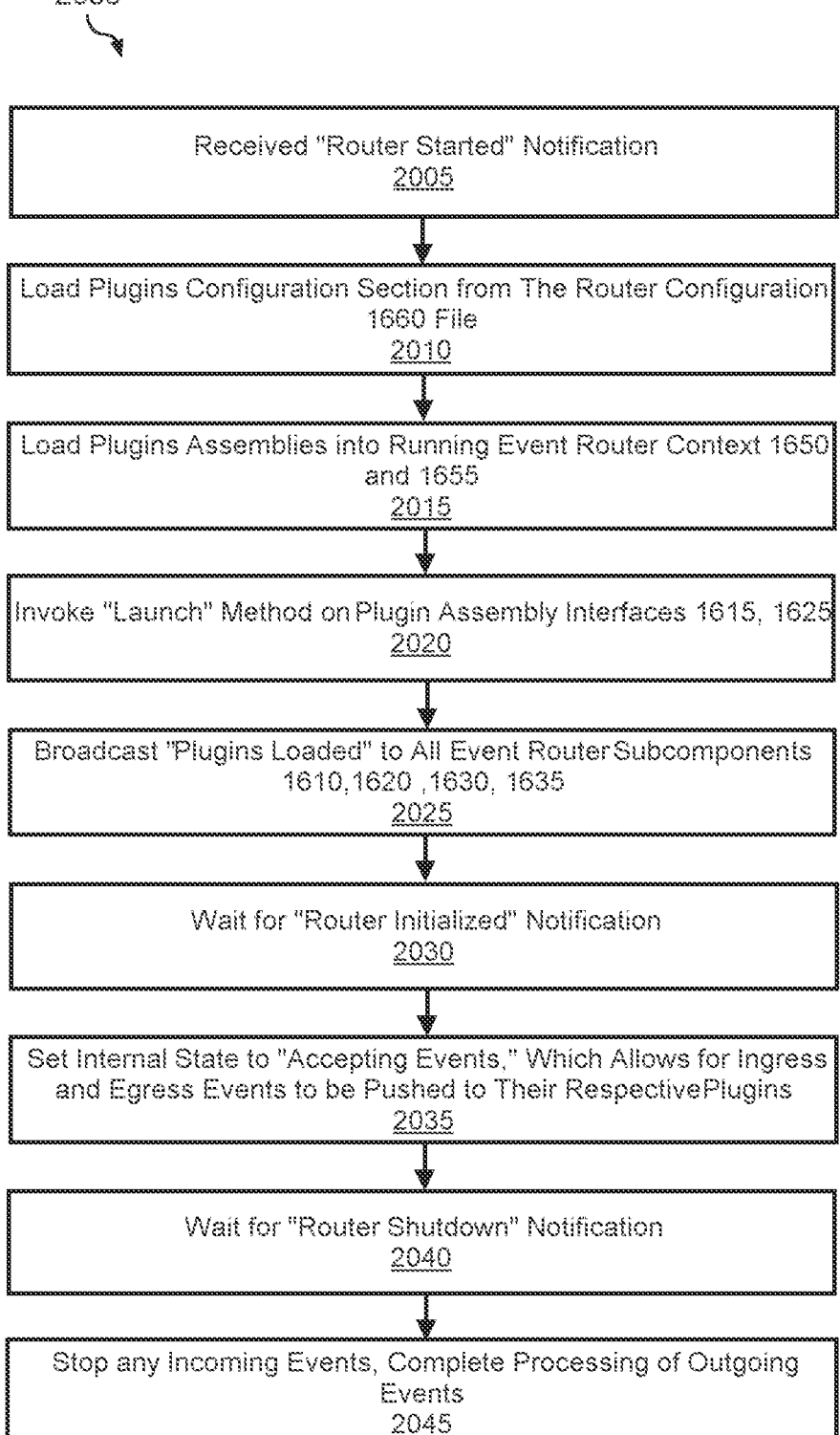

Received "Router Started" Notification
2005

Load Plugins Configuration Section from The Router Configuration
1660 File
2010

Load Plugins Assemblies into Running Event Router Context 1650
and 1655
2015

Invoke "Launch" Method on Plugin Assembly Interfaces 1615, 1625
2020

Broadcast "Plugins Loaded" to All Event Router Subcomponents
1610,1620 ,1630, 1635
2025

Wait for "Router Initialized" Notification
2030

Set Internal State to "Accepting Events," Which Allows for Ingress
and Egress Events to be Pushed to Their Respective Plugins
2035

Wait for "Router Shutdown" Notification
2040

Stop any Incoming Events, Complete Processing of Outgoing
Events
2045

2500
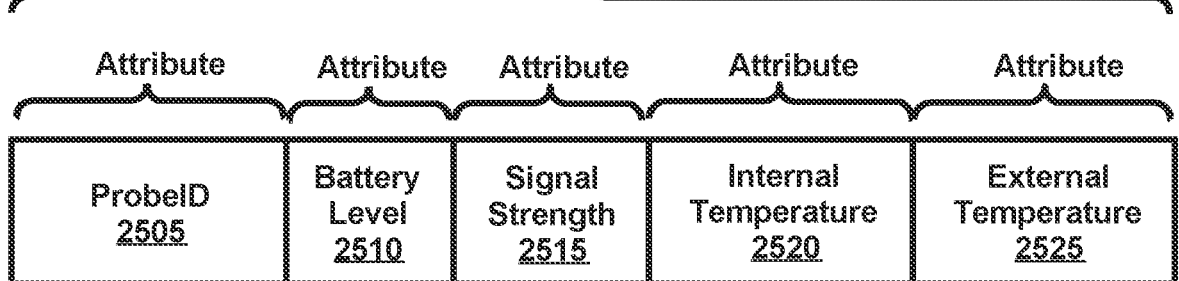
CookingTemperature#V1
Domain
| Attribute | Attribute | Attribute | Attribute | Attribute |
|---|---|---|---|---|
| ProbeID 2505 | Battery Level 2510 | Signal Strength 2515 | Internal Temperature 2520 | External Temperature 2525 |
FIG. 25

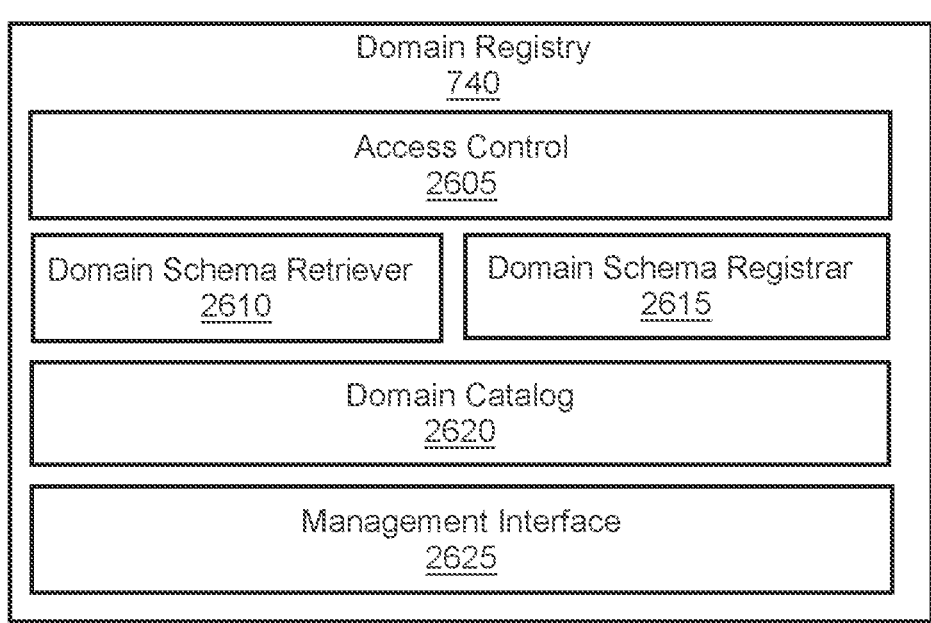
FIG. 26

Domain Endpoint Resolver - Endpoint Table

| Target | Target IP | Domain | Source | Source IP |
|--------|-----------|--------|--------|-----------|
| Router B | 10.0.0.3:1003 | domain.a | Router A | 10.0.0.1:1001 |
| Router C | 10.0.0.2:1002 | domain.c | Router B | 10.0.0.3:1003 |
| Router C | 10.0.0.2:1002 | domain.B | Router A | 10.0.0.1:1001 |
| Sink1 | 10.0.0.4:1004 | domain.d | Router C | 10.0.0.2:1002 |
| Sink1 | 10.0.0.4:1004 | domain.c | Router B | 10.0.0.3:1003 |

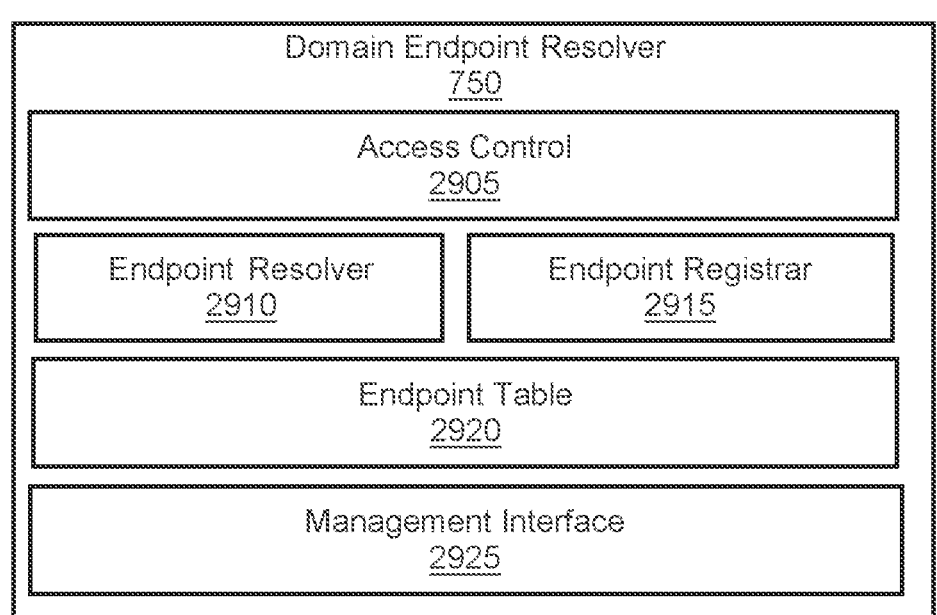
FIG. 29

SYSTEM AND METHOD FOR MAKING EVENT ROUTING DECISIONS BASED ON A STANDARDIZED MESSAGES FORMAT

CROSS-REFERENCE TO RELATED APPLICATIONS

This application is a continuation application of PCT patent application no. PCT/US2023/073596, titled "SYSTEM AND METHOD FOR MAKING EVENT ROUTING DECISIONS BASED ON A STANDARDIZED MESSAGES FORMAT", filed on Sep. 7, 2023, which claims the benefit of priority of U.S. provisional patent application No. 63/379,908, titled "SYSTEM AND METHOD FOR MAKING ROUTING DECISIONS BASED ON (DOMAIN, ENTITY, ATTRIBUTE, VALUE) EVENT-BASED ROUTING", filed on Oct. 18, 2022, which are all incorporated by reference herein in their entireties.

FIELD OF INVENTION

Embodiments of the present disclosure relate to event-based routing, and more particularly to a system and method for making routing decisions based on a standardized message format.

BACKGROUND

Event processing is critical for the ongoing success of businesses, in their ability to respond to changing circumstances and to capture value.

This current growth in event processing and analytics has several epicenters, one of which is the intersection of Operational Technology and Information Technology. This intersection has created the following business areas:

Development Operations (DevOps)
Data Operations (DataOps)
Revenue Operations (RevOps)
Sales Operation (SalesOps)
Industry 4.0 with the promise of the next revolution, greater efficiencies in productivity requiring:
Real-time data analytics with data from disparate sources
Artificial Intelligence, the search for new Business Models and Revenue sources
Industrial IoT
Edge Computing
Smart Factories
Smart Supply Chains
Device manufacturers
Customer facing analytics, the need for near real-time event delivery and processing is crucial for in-the-moment customer decisioning.
All these epicenters require event processing at its core, where business activity is driven by event notification streams, or device telemetry data, or process instrumentation, making businesses agile and resilient to change by enabling them to adapt to changing events in real-time.
Event Processing is needed:
For Real-Time event capture
For Device Instrumentation
For Process Instrumentation
For Customer Facing Analytics
To Normalize Data
To Integrate data from different event sources
To Filter events
To Transform Events
To Provide Local Compute- or localized decision making To Operate at the edge
To Enable Smart Devices
To Provide a basis for analytics
Accordingly, a need exists for improved methods and systems that help businesses perform event processing at a scale and speed desired by such businesses.

SUMMARY

An Event Router ecosystem for making routing decisions based on values included in a standardized event structure is disclosed. The Event Router ecosystem is a solution to the problem of exchanging, normalizing, and transforming event data between different interacting entities, to form a coherent business transaction, or enact business workflow(s). The Event Router ecosystem includes an Event Router Domain Rules Language Compiler, Event Router, Event Router Management, Domain Registry, and Domain Endpoint Resolver. The Domain Endpoint Resolver determines routing endpoint(s) for events. The Event Router ingests incoming event data, applies the executable domain, and rules specifications. The Domain Registry defines and stores the shape and structure of domain definition data, and how data is made available to all participating subsystems. The Event Router Domain Rules Language Compiler parses and compiles a Domain Event Router rules file into executable binary instructions.

BRIEF DESCRIPTION OF DRA WINGS

The disclosure will be described and explained with additional specificity and detail with the accompanying figures in which:

FIG. 2 depicts an event centric integration pattern that is required to exchange event data between different systems/applications when their event data formats are different;

FIG. 7 is a block diagram depicting an embodiment of processes supporting an Event Router ecosystem, in accordance with an embodiment of the present disclosure;

FIG. 11 is a depiction of an abstract syntax representation for the expression a=5+6;

FIG. 18 depicts an embodied instance of a domain definition for a temperature sensor with four Domain Attributes;

FIG. 19 illustrates a flowchart for orchestrating the startup, shutdown, and running of an Event Router, in accordance with an embodiment of the present disclosure;

FIG. 20 illustrates a flowchart for loading and binding plugins specified in the router configuration file, in accordance with an embodiment of the present disclosure;

FIG. 25 depicts an embodied Cooking Temperature domain definition with five Domain Attributes;

FIG. 26 is a block diagram depicting an embodiment of a Domain Registry implemented to register domain definitions and provide the domain definitions to other processes, such as those shown in FIG. 12, in accordance with an embodiment of the present disclosure;

FIGS. 28A and 28B are a schematic representation that depicts a network of one source router, two event routers and one endpoint event sink, and the endpoint table that is maintained by every domain endpoint resolver within the network of event routers, in accordance with an embodiment of the present disclosure;

FIG. 29 is a block diagram depicting an embodiment of a Domain Endpoint Resolver implemented to allow Event Routers to send events to registered event sink endpoints, such as those shown in FIG. 7, in accordance with an embodiment of the present disclosure;

Figure 1:
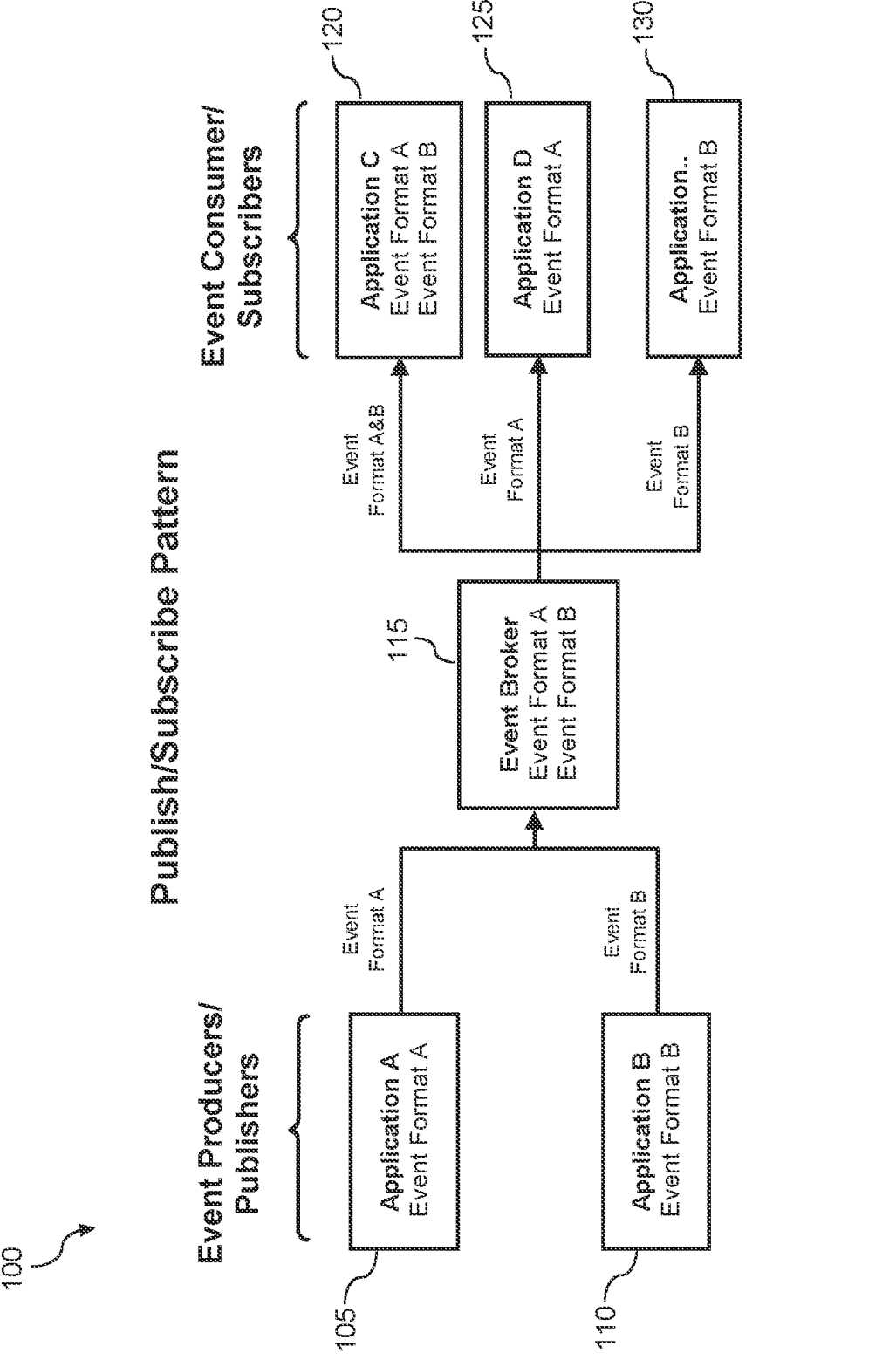
FIG. 1 depicts a Publish/Subscribe Architectural pattern, with applications that publish messages to an Event Broker, and applications that subscribe to receive events from an Event Broker.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

A computer system (standalone, client or server computer system) configured by an application may constitute a "module" that is configured and operated to perform certain operations. In one embodiment, the "module" may be implemented mechanically or electronically, so a module may comprise dedicated circuitry or logic that is permanently configured (within a special-purpose processor) to perform certain operations. In another embodiment, a "module" may also comprise programmable logic or circuitry (as encompassed within a general-purpose processor or other programmable processor) that is temporarily configured by software to perform certain operations.

Accordingly, the term "module" should be understood to encompass a tangible entity, be that an entity that is physically constructed permanently configured (hardwired) or temporarily configured (programmed) to operate in a certain manner and/or to perform certain operations described herein.

General Overview

Billions and billions of events occur every minute of the day. A computer mouse click signals an event to initiate a banking transaction in a web browser. An event indicating that the programmed time to turn on the lawn sprinkler has been reached is sent to the lawn sprinkler controller system to turn on the sprinkler valve, thereby irrigating the lawn. A temperature sensor sends a continuous stream of events whenever the temperature changes. Events can happen at any time and are therefore asynchronous by nature. Events inform us about something that has happened, a mouse clicked, temperature changed, a clock time was reached. We can choose to either respond to an event or to ignore the event. Events signal information about a system, typically a change of state. Events are produced, consumed, or ignored.

Event producers create events based upon changes or event triggers that the event producer deems as important. Event flow is unidirectional from producer (or publisher) to consumer (or subscriber).

An event consumer (or subscriber) will typically register interest in consuming specific events, thereby ignoring events in which it has no interest even if the event producers produce more events than what the consumer (or subscriber) is interested in. The event consumer (or subscriber) will typically decide upon a course of action to take whenever the event is received. Contextual information about the event is associated with the event in the form of an associated data payload of contextual data. A thermometer sensor sends a continuous stream of events, as well as the thermometer identifier along with the new temperature value to the consumers of such events. The consumer of the event can then extract the contextual event data and act upon that event, like turning on the air conditioner in the car.

The prevailing industry pattern for facilitating the exchange of events between a producer and consumer is to have an Event Broker acting as an intermediary between the event Publisher (the producer) and Subscriber (the consumer). The event consumer will register or subscribe with the Event Broker to receive events of interest, and the event producer will publish events to the Event Broker. The Event Broker effectively intermediates between the two parties to deliver the events. This allows for loose coupling between the two parties, where the publisher has no knowledge of the subscribers to an event and vice versa. Loose coupling between publisher and subscriber is a desirable property because it makes systems flexible, resilient, and scalable. The prevailing industry pattern is depicted in FIG. 1. The Event Broker is responsible for forwarding event messages onto the registered event subscribers. Some event brokers may persist the event data on storage devices. An Event Broker can act as the intermediary for several different event message types or event topics. Event Brokers do not route an event based upon the content of the event; they are event content agnostic.

In this pattern of publisher/subscriber the subscriber must implement the event format that the publisher defines. As depicted in FIG. 1, Application D 125 (a subscriber) must understand the event data format that Application A 105 (the publisher) implements. The subscriber 120, 125, 130 must implement the same data model to consume event data from the publisher 105, 110 for the exchange of data to occur. This means that two independent parties are maintaining similar data models, however doing so independently of one another. This poses problems in terms of evolving the underlying data model. If the publisher changes the underlying data model, then all consumers will need to change in lock step. At times the publisher will need to extend the data format of the event, thereby potentially breaking downstream consumption of the event message by subscribers. They expect messages in a specific format but get it in a different format. To circumvent this issue, data models are typically versioned, making it possible for publishers to evolve their data models independently of subscribers, and it gives subscribers the freedom to choose which version of the data layout to choose. However, it still holds true that both the producer and consumer must align on the same underlying data model for the event and data payload exchange to occur.

In a Publish/Subscribe Pattern implementation, the Event Broker 115 is a central hub through which all messaging passes, making it simultaneously highly effective but also a critical failure point in this design. The Event Broker 115 is itself a complex ecosystem of distributed computer servers that act in concert to deliver event messages to the appropriate subscribers, based upon what the subscriber application has indicated as messages that it would like to receive. The Event Broker 115 does not route any event messages from producer to subscriber based upon the content of the event message.

The exchange of data between systems creates value, it allows for business transactions to be created, and is therefore a critical need of any business. The lack of a common event message data format makes the exchange of data between systems complex as it introduces many intermediary processes that are involved in the normalization, filtering or transformation of event data and data formats from one layout to another. This transformational process is depicted in FIG. 2.

Figure 2:
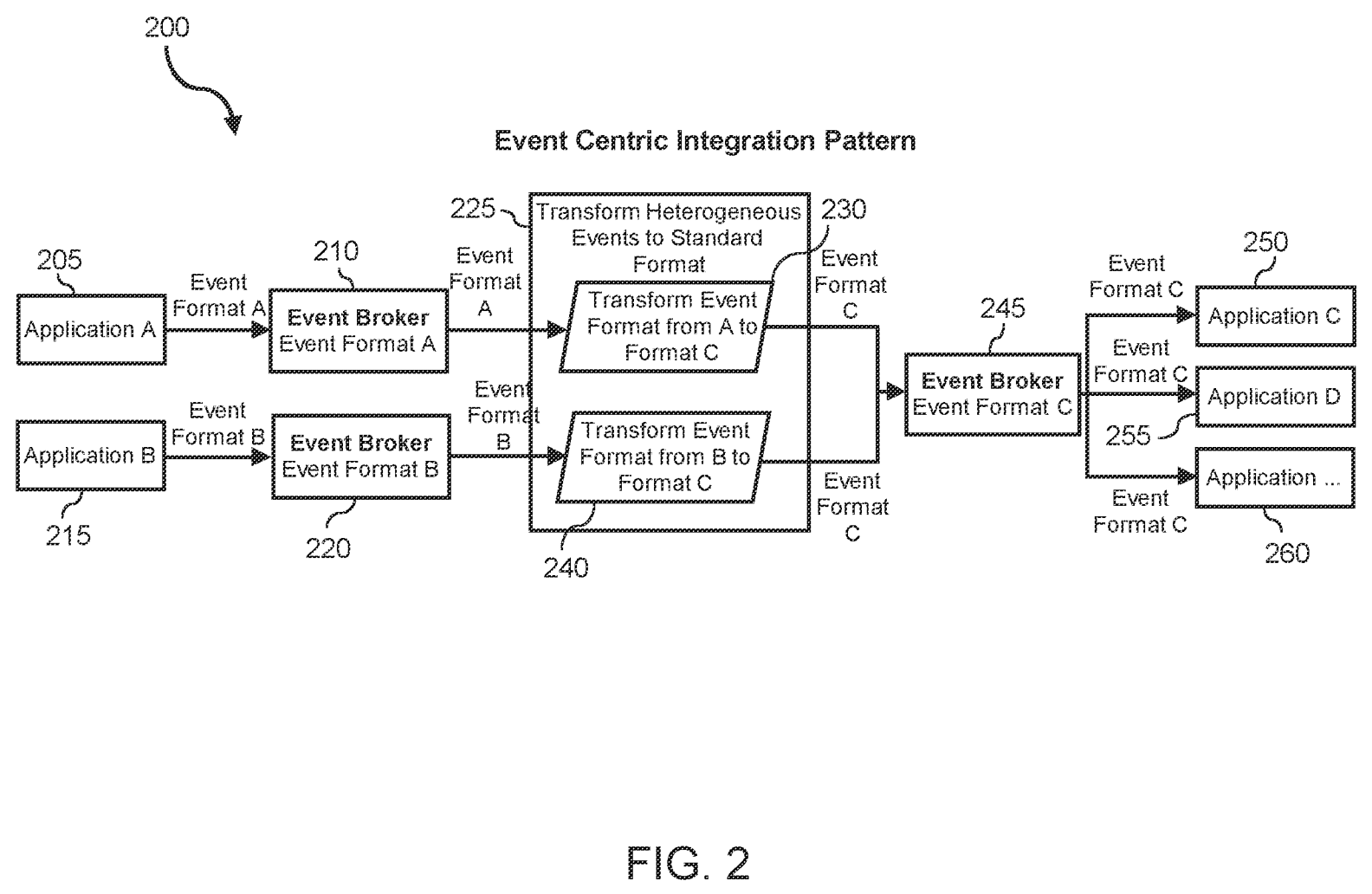

In the process 200 of exchanging data between Application A 205 and Application C 250, depicted in FIG. 2. Application C 250 is subscribed to receive events in event format C from the Event Broker 245 that publishes event C data. Whereas Application A 205 publishes events in event format A to the Event Broker 210 that receives event format A messages. There is an event data format incompatibility between the event publisher and the event subscriber, Application A 205, and C 250, respectively. To align the event data format an Event Transformation 230, 240 process is introduced that translates heterogeneous events from one format to another, or as depicted in FIG. 2, translating and event from event format A to event format C 230.

Depending upon the number of system integrations that are needed, this pattern can become a complex, as the set of transformations increases, it also adds additional compute burden to the Event Broker infrastructure, because an Event Translation compute layer is needed, and a new Event Broker topic needs to be processed for each Transformation layer required.

The compute footprint, in terms of running processes, of this event integration pattern in non-trivial. Several servers may be required to run the Event Broker infrastructure and additional ones for the applications. What further complicates this integration pattern is if the integration between systems crosses organizational boundaries, or more complex, if the integration spans different companies or institutions.

Having different event formats is a particularly persistent problem for Internet of Things (IOT) or Industrial Internet of Things (IIoT) devices, where each manufacturer of a device implements their own event data formats with no standardization on event data format for things like controlling the device or even the data format of the sensor data itself. One temperature device sensor manufacturer may report temperature in degrees Fahrenheit and another may report temperature in degrees Celsius. They will also have different data and event formats to communicate with the device itself.

This disclosure will improve upon and eliminate shortcomings and complexities of the prevailing event-based publish/subscribe model as well as addressing the lack of a standard event data format. It will also provide an alternative to a centralized Event Broker, where instead it relies on a decentralized and federated network of Event Routers.

Figure 3:
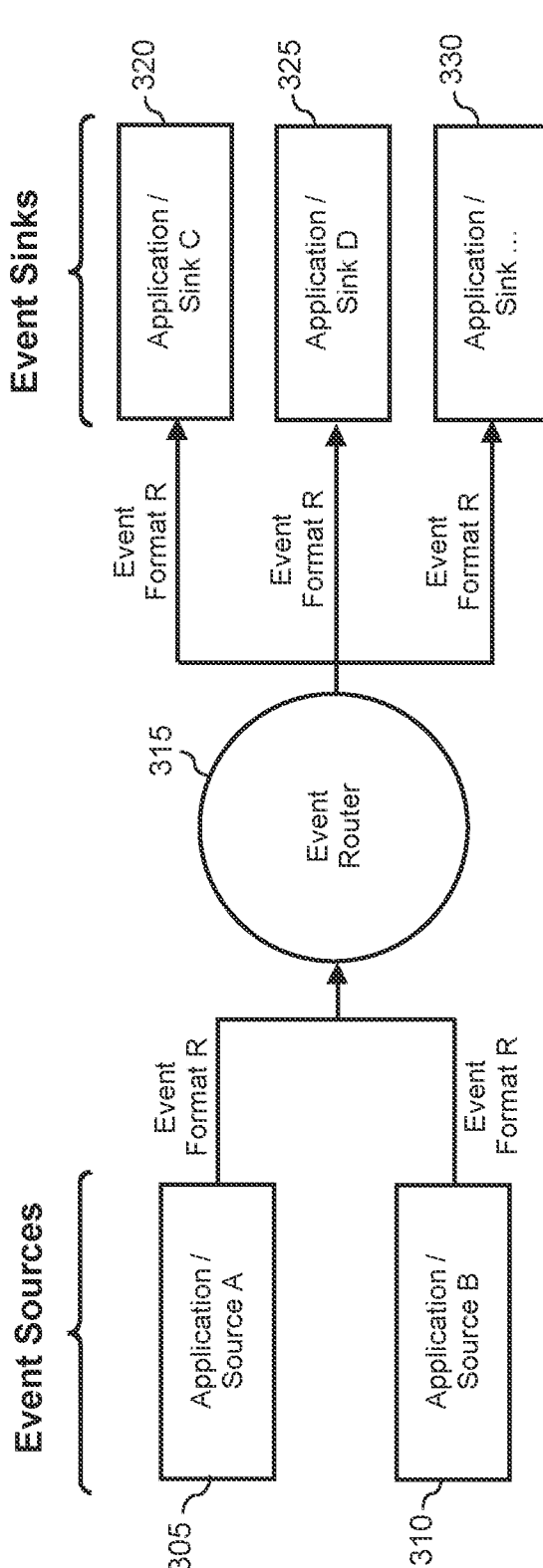
FIG. 3 depicts an event router integration pattern, where the event format is standardized between the event generating applications, the event router, and applications receiving the event messages.
Figure 4:
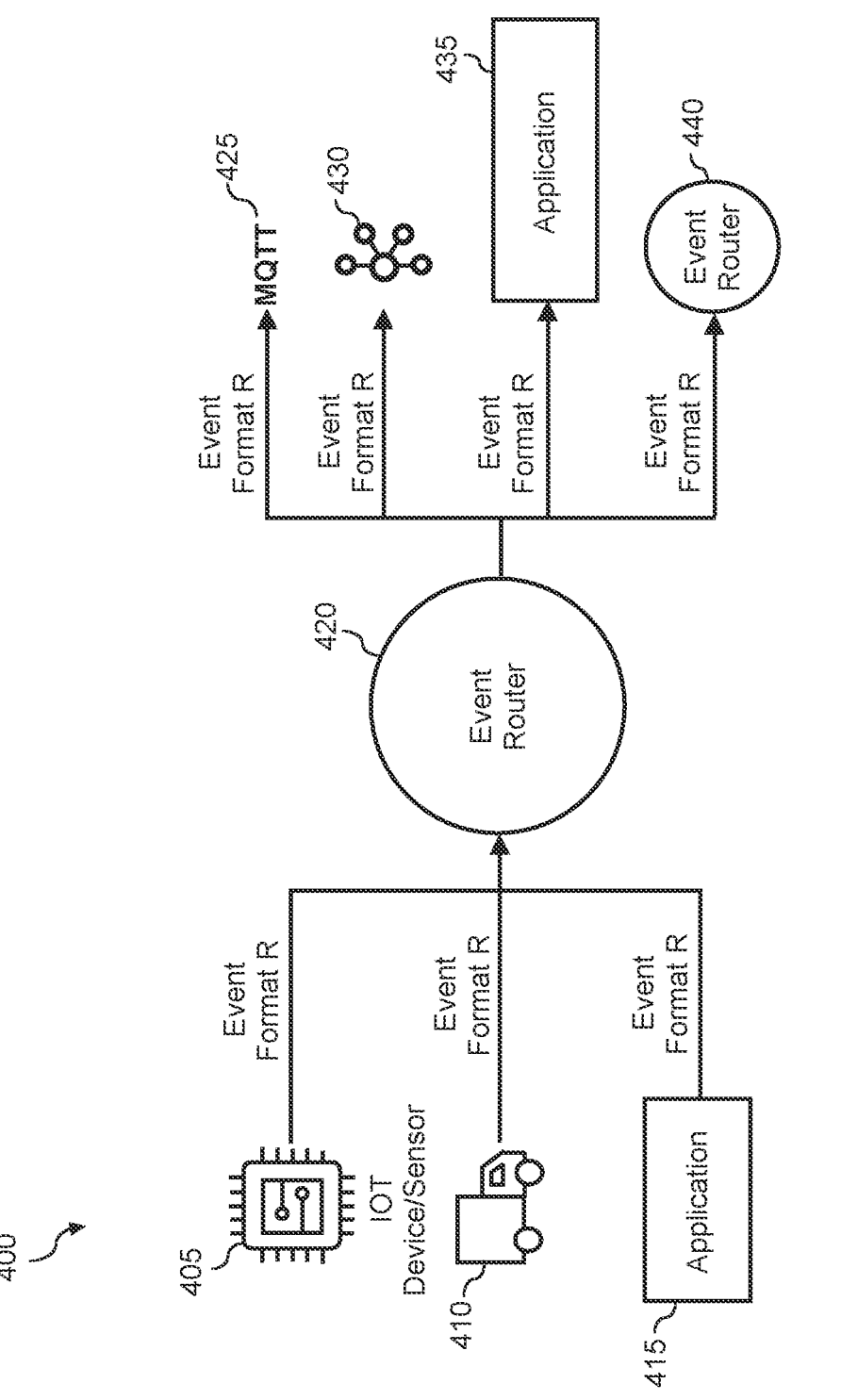
FIG. 4 depicts an event router integration pattern between different event producers and event consumers using the standardized event message format.

Standardizing the event format eliminates the need to have multiple Event Brokers or to have an Event Transformation layer that translates between different event formats. This is depicted in FIG. 3. Instead, an application 305, 310 sends the event to the Event Router 315 in a standardized format, where the Event Router 315 will route the event to the intended destination sink 320, 325, 330 using the same standardized event format, which is typically an application or another Event Router 315 that then processes that event. The event data format is the same between sender and receiver or source and sink. This model can also be extended to IoT or IIOT devices where they can send and receive events in a standardized format. This is depicted in FIG. 4, where an IoT device can send an event in the same format that an Apache Kafka cluster sink endpoint can receive the data, where the sending sources 405, 410, 415 and receiving sinks 425, 430, 435, 440 in the same event format. Here, example sending sources include an IOT device/sensor 405, a mobile IOT device/sensor 410, and an application 415. Example receiving sinks include an MQTT device 425, an IOT device 430, an application 425, or an event router 440. The same Apache Kafka sink could also receive event data using the same event format from applications or logistic systems that track package deliveries. This makes the exchange of data less complex and allows for the creation of an ecosystem of interoperating computing nodes that can accept data in this format. An Event Router 420 can also send an event to another Event Router 440, thereby making it possible to create a network of interconnected Event Routers.

Having a standardized event data format opens the ability to inspect the values of the event data itself, because the structure is understood, this makes it possible to do event filtering, normalization, transformation and/or routing logic/decision based upon the data contained within the event, because the event structure is known and can be relied upon. For example, if the event data contains an attribute to hold the temperature value of a temperature sensor, the Event Router can then translate and normalize the temperature to the desired conversion locale, or it could decide to filter out temperature values that do not fall within a certain rage, and not forward these events onto the destination endpoints or event sinks. The Event Router can perform localized filtering, normalization, transformation, and routing logic without the need for an event broker or an intermediate Event Translation layer. Achieving this with the traditional Publish/Subscribe/Event Broker pattern, where heterogeneous data formats make this almost too complex to make it viable to implement.

For ease of discussion in the specification, the embodiment of the event message format is a quadruple in the format of (Domain, Entity, Attribute, Value) but it is appreciated that the tuple may embody additional elements and is not limited to a quadruple structure. The Event Router may accept and send events in the form of a quadruple of (Domain, Entity, Attribute, Value), with an ambient date time property that accompanies the event data, representing the date and time when the event was created, but is not limited to this structure. This quadruple structure is sufficient to capture the value of any attribute within a given data domain, an attribute within that domain, and for a specific entity, at a specific time.

An entity is a thing or concept of significance about which we want to capture data. It is something that an enterprise, business, organization, or institution values. It may be the product that is produced or the service an enterprise, business, organization, or institution performs. For a car manufacturer, cars are of significance. Cars in this context describe the entity type, whereas a specific instance of a car, like car number ADC-76488-137, is about a specific car entity. In this case the car number serves as the unique identifier that identifies a specific car entity. Only one car can have this identifier. The entity value is unique for any quadruple (domain, entity, attribute, value) event message.

Entities or entity types have properties associated with them. An attribute is a property of an entity type that describes a particular characteristic of that entity type. The attribute has a value for each instance of that entity type. Attributes do not exist by themselves and should be discussed within the context of an associated entity. The entity type "Car" may have attributes like Color, Make, Model, and Year associated with it. The attributes have meaning in the context of the entity type, and by themselves do not impart any information. For example, the color Blue by itself imparts no information. Whereas the color Blue in the context of a car has meaning or imparts information about a car, namely that it is a blue car.

Figure 5:
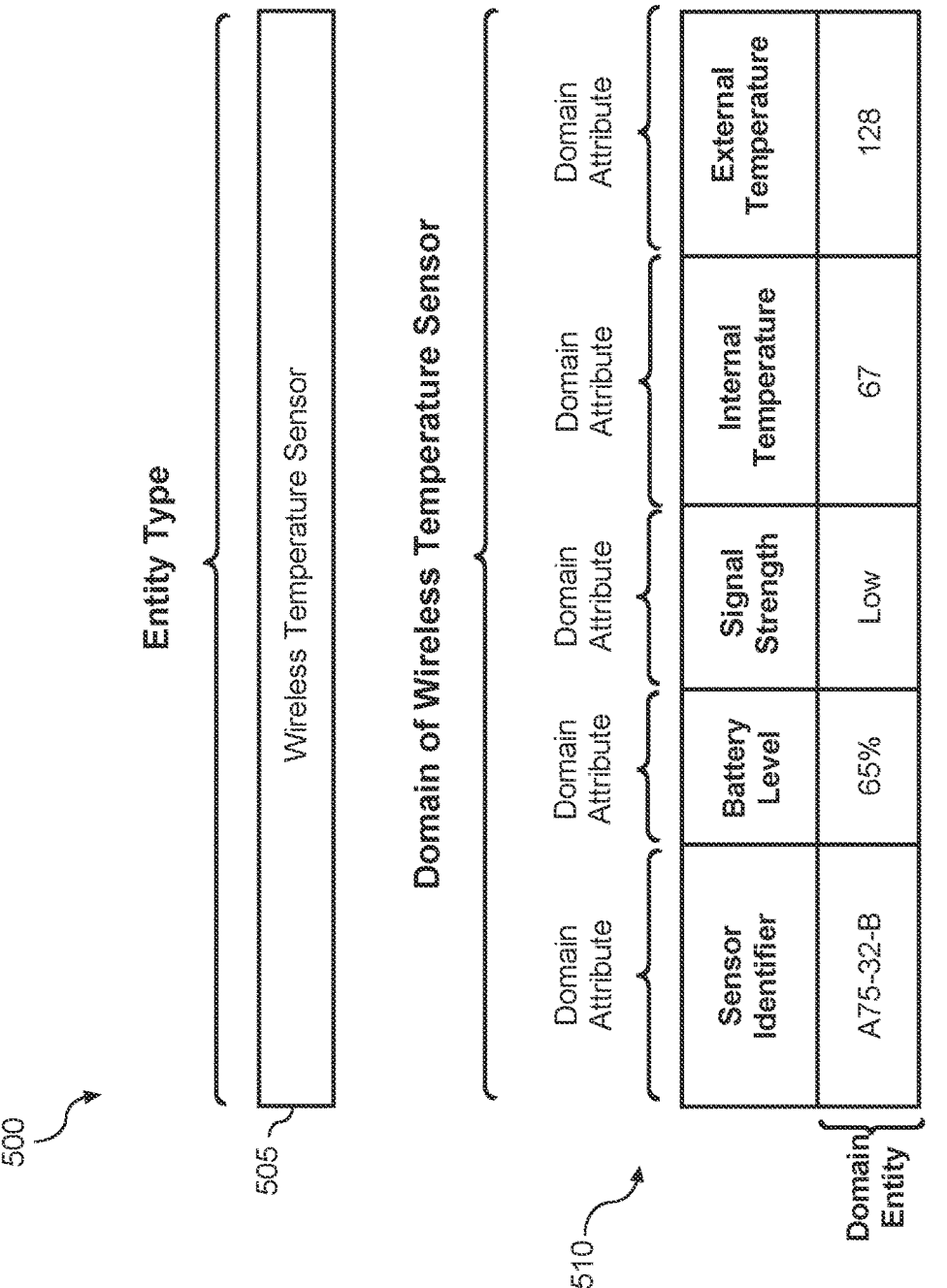
FIG. 5 depicts the relationships between an Entity Type, a Domain for that Entity Type the Domain Attributes for the Domain, and an example of a Domain Entity.

The entity type, as mentioned has attributes associated with that type, this collection of attributes is what is referred to as the domain of an entity type, it is the set of attributes associated with that entity type. It constitutes the domain of interest, and therefore represents the attributes that are of significance to an enterprise, business, organization, or institution for an entity type. As depicted in FIG. 5, for example, entity type 505 is "Wireless Temperature Sensor". Using the entity type of "Wireless Temperature Sensor" as an example, we can articulate that the following domain attributes 510 of:

Sensor Identifier
Battery Level
Signal Strength
Internal Temperature
External Temperature are of significance for such a sensor. These attributes constitute the domain of the "Wireless Temperature Sensor". "Wireless Temperature Sensor" is the entity type.

These concepts are represented in FIG. 5, where the quadruple event message of ("Wireless Temperature Sensor", "A75-32-B", "Battery Level", 65%) fully qualifies the Battery Level for Wireless Temperature Sensor A75-32-B' as having a value of 65%. Where the first element in the quadruple is the Domain, the second element the Entity, the third element the Attribute, and the last element the actual Value.

This event message quadruple can be expressed in JSON format as follows:

```
{
    "Domain": " Wireless Temperature Sensor ",
    "Entity": " A75-32-B ",
    "Attribute": " Battery Level ",
    "Value": 65
}
```

The Value element of the event message quadruple can have different data types associated with is. The Value can be numeric, textual, date time, or binary data.

Given the quadruple structure (Domain, Entity, Attribute, Value) of the event data, a process can inspect the values of the elements within the quadruple and make decisions based upon the contained values. For example, A rule could be specified to drop events from further propagation if the "Internal Temperature" attribute's Value is below 50 degrees or above 200 degrees. Another rule could define how an event is routed to another Domain. For example, if the Entity element of the quadruple starts with "A75" the event should be routed to Domain "Oven 1 Sensors". In this way the Event Router can have routing, normalization, transformational, and filtering logic based upon the values of the elements within the event message (Domain, Entity, Attribute, Value) quadruple. An Event Router can provide local compute capabilities that is not possible with the traditional Event Broker Publish/Subscribe pattern.

The granularity of an event is at the domain attribute level, and is therefore a very granular or atomic event, which makes it ideal for event processing at the device or application server level.

An Event Router is configured to only accept event messages for given Domains. An event that specifies a Domain value that is not within the Domains configured for that the Event Router is ignored.

As opposed to the Publish/Subscribe pattern that uses different processes for each of the event publishers, the event brokers and event subscribers, an Event Router encapsulates the functionality of event publisher, event subscriber and event broker into a single executable process. This makes it possible to have Event Routers deployed on Edge devices and/or large-scale data center servers, without the need for a central Event Broker through which all messages flow. Instead, Event Routers collaborate to establish a peer-to-peer communication pattern rather than a centralized communications model. This also makes a network of event routers more resilient to failure given that alternate routing paths can be established, versus a central point of compute scaling and failure.

Figure 6:
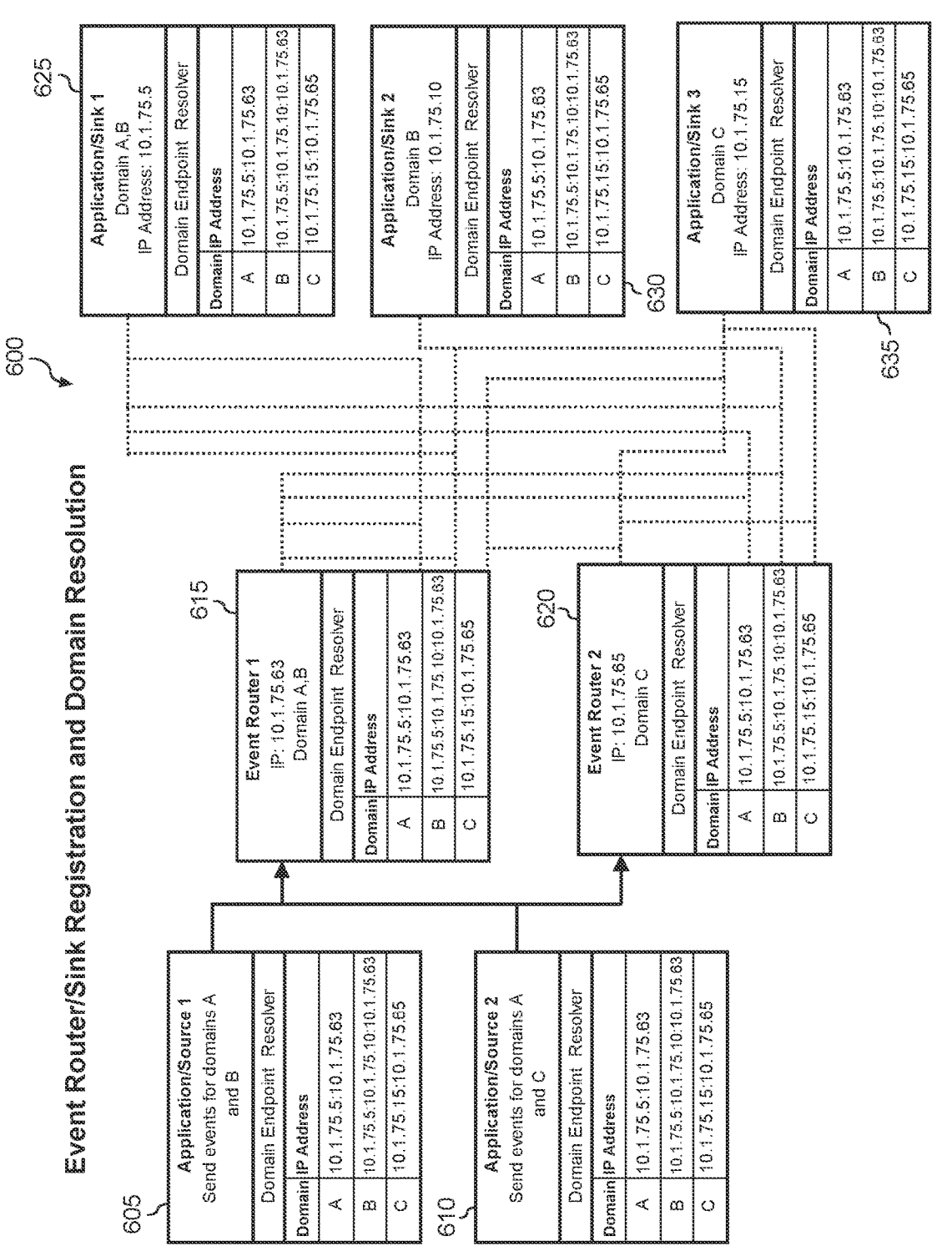
FIG. 6 depicts a network of event producers, event routers and event sinks, with associated Domain Endpoint Resolvers that aids in resolving domain names with event routers and sinks.

To achieve loose coupling between event source and event sink, every Event Router's Endpoint Resolver or Event Sink's Endpoint Resolver application broadcasts the domain for which it can receive event messages for, as well as the IP address of the machine that it is running on. Every Endpoint Resolver builds an internal routing table of Domain and IP address values. Every Endpoint Resolver in the network will know about all the Domain endpoints within that network of Event Routers and event sinks. The internal routing table is dynamically adjusted by each Event Router or event sink whenever they shut down or startup. This distributed and federated model where every Event Router knows the Domains and IP addresses of every other Event Router or event sink is different from the centralized Event Broker model, even if the Event Broker is a cluster of machines, it is still a central model though which all events messages must pass. In the federated and distributed model, there is no single point of failure, and there may exist redundant paths for events to reach their intended endpoint(s). FIG. 6 is a logical depiction of such a network and how endpoint resolution is made possible.

The event-based brokers or integration applications typically act as intermediaries between systems, notifying one system of a change in another system. This exchange of data can also occur across organizational or institutional boundaries.

Event-based systems make it possible to build reactive, autonomic, or closed loop systems that can adjust behavior based on the events the systems receive. The Event Router in this disclosure is one such event-based system that makes autonomic systems appealing given that it can provide localized decision-making logic, without the need of intervening processes or translation layers, thereby simplifying the overall design of complex event-based systems.

An Event Router can execute on a single computer server, embedded or hardware device, consequently, does not require the complex infrastructure that the traditional publish/subscribe pattern necessitates. Here, for example, Applications/Sources 605, 610 communicate with Event Routers 615, 620 and Event Routers 615, 620 communicate with Applications/Sources 625, 630, 635, as depicted in FIG. 6.

Event Router Ecosystem Overview

FIG. 7 is a block diagram depicting an embodiment of processes supporting an Event Router ecosystem 700, in accordance with an embodiment of the present disclosure. FIG. 7 represents one solution to the problem of exchanging, normalizing, and transforming Event Data between different interacting systems and/or entities. The Event Router ecosystem 700 includes but is not limited to an Event Router Domain Rules Language Compiler 710, Event Router 720, Event Router Management 730, Domain Registry 740, and Domain Endpoint Resolver 750.

Event Router Domain Rules Language Compiler 710

Structural Overview

Figure 8:
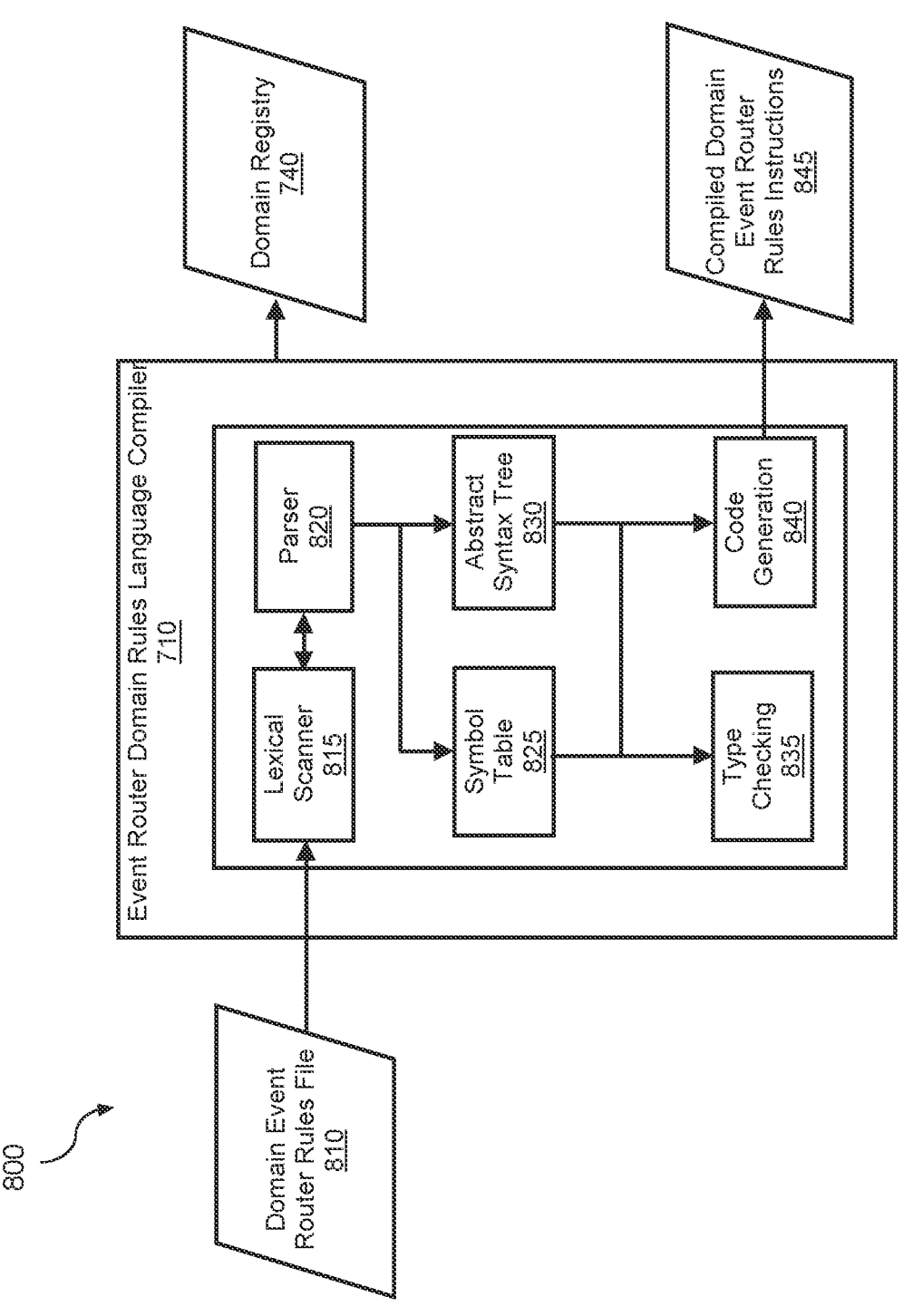
FIG. 8 is a block diagram depicting an Event Router Domain Rules Language Compiler implemented to compile source rules into binary instructions, and executed by an embodied Event Router such as shown in FIG. 12, in accordance with an embodiment of the present disclosure.

FIG. 8 depicts subcomponents within the Event Router Domain Rules Language Compiler (i.e., a rules compiler) 710. A Lexical Scanner 815, a Parser 820 for the domain rules language, a Symbol Table 825, an Abstract Syntax Tree 830, a Type Checking 835 component and a Code Generation 840 component.

In an embodiment, the Event Router Domain Rules Language Compiler 710 is implemented to parse and compile a Domain Event Router Rules File (rules file) 810 into a binary executable Domain Event Router Rules Instructions file (i.e., router instructions) 845. The rules file 810 and router instructions 845, define and implement routing rules for incoming events, rules to normalize or transform the incoming Event Data, and rules to route the Event Data to known endpoints, and to emit new events. The rules compiler 710 is responsible for compiling human readable domain and rules specification in the form of a domain and rules language, to a binary executable format, which can be executed by the Event Router 720.

In an embodiment, the Domain Specific Language for the rule compiler, supports instructions to compare values, transform values using normal arithmetic, relational and boolean operators, as well as several functions, like concat, len, toUpper, toLower, and substring, but not limited to. There is an operator to emit an event value for a given domain, entity, and attribute.

In an embodiment, the rules compiler 710 can be configured to make use of the Domain Registry 740 functionality, to request the definition of a specific domain name, version and the associated domain attribute names and data types, as illustrated in FIG. 8. This domain definition will be used and will be compiled into the router instructions output file 845. Functional Overview FIG. 8 depicts an example of the Event Router Domain Rules Language Compiler 710 translating a textual representation of a rules file 810 into binary router instructions 845 (i.e., Compiled Domain Event Router Rules Instructions 845), in accordance with an embodiment of the present disclosure. The rules file 810 is a well-defined domain rules grammar specification. The router instructions 845 is a binary file containing byte-code instructions to be executed by the Event Router 720, as per the rules specified in the Domain Event Router Rules File 810.

It may be appreciated that, in one embodiment, the binary file 845 consists of two segments, a) A Data Segment may contain the schema definition and may be instantiated in the Event Router (e.g., Virtual Machine) as the symbol table. b) A code/instruction segment may contain the operator and operands for each instruction supported by the processor or virtual machine (Domain Rules Evaluation Engine 1230). Thus, the domain definition is part of the binary file 845.

It may also be appreciated that, in one embodiment, the binary file 845 represents the instruction set for a virtual machine that is embodied in the Event Router 720 as part of the Domain Rules Evaluation Engine 1230 and not the instruction set for a specific processor. The Event Router implements a virtual machine that loads the binary file and then executes the instruction set. The binary file is a representation of 3-address code format.

In another embodiment, a compiler may target a specific device, including the processor for that device. In such an embodiment, the Event Router would not be a virtual machine, but rather an executable running natively on that device. The Code Generation 840 component of the rules compiler 710 would create instruction sets for the target device.

Figure 9:
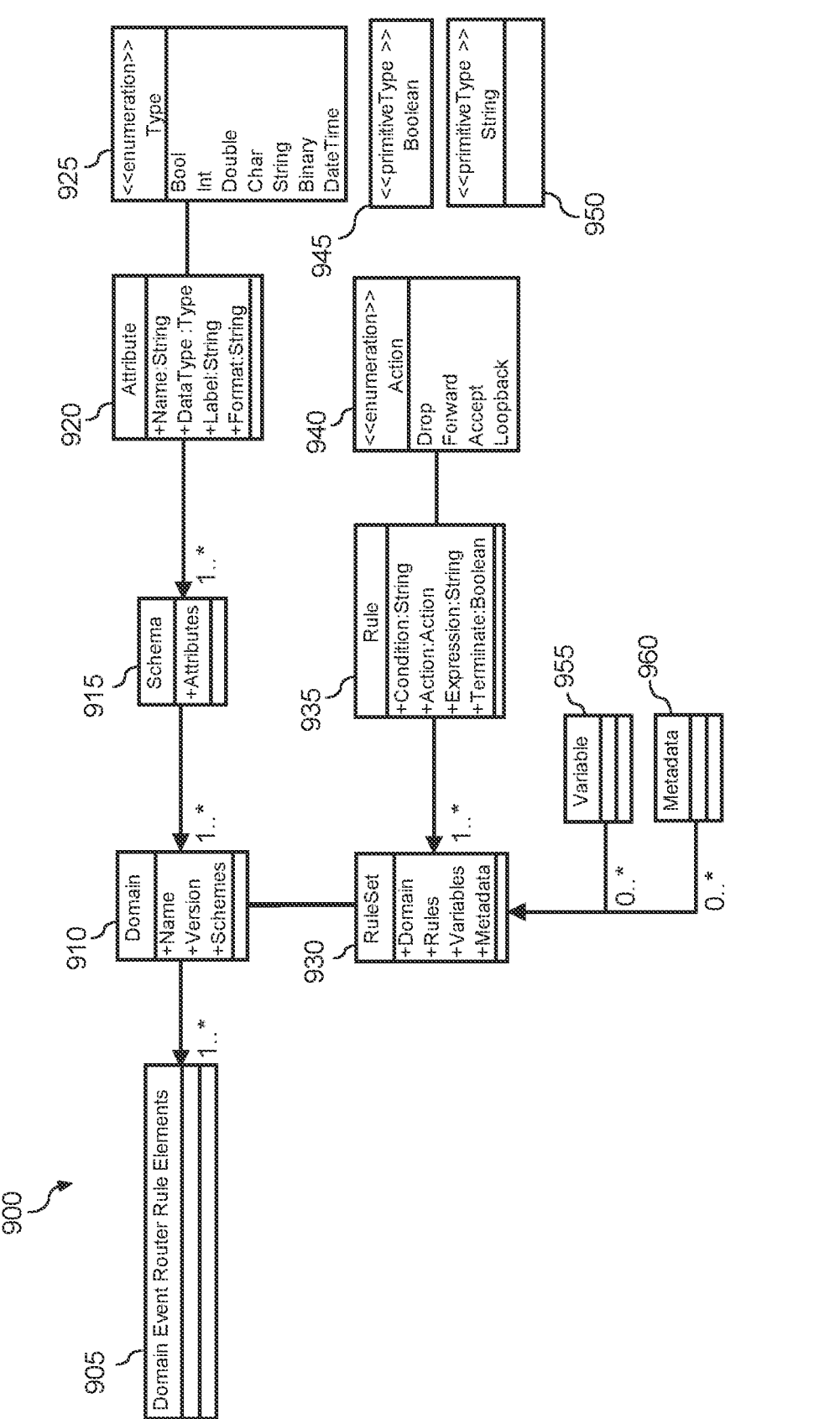
FIG. 9 is a block diagram depicting a unified modeling language class diagram of key components of the domain rules language and their relationships, in accordance with an embodiment of the present disclosure.

FIG. 9 is a block diagram depicting a unified modeling language (UML) class diagram of key components of a Domain Event Router Rules File 810, and their relationships, in accordance with an embodiment of the present disclosure. In an embodiment, the rules file 810 includes one or more domain(s) 910. Each domain 910 includes one or more schema definitions 915. The Schema definition 915 includes one or more attributes 920, where each attribute includes at least a name and data type 925 associated with the attribute 920. The domain 910 is associated with ruleset 930 in the definition or declaration of a ruleset. Ruleset 930 governs how event messages will be treated based upon the rules specified therein. Each ruleset 930 includes one or more rules 935. Each rule 935 includes a conditional statement, an action statement 940, expression, and terminate attributes. The condition attribute is boolean expression. The action 940 attribute defines what action to take if the condition expression is true. The expression attribute is a textual value of transform statements. The terminate attribute determines if a given rule will terminate or not. In an embodiment, multiple rule sets are defined for the same domain, in which case each rule set is evaluated in order of specification.

It may also be appreciated that, in another embodiment, the entities depicted in FIG. 9 may be extended to include additional elements that extend the basic underlying model as depicted.

The following is an example of an input rules file 810 in accordance with the UML specification depicted in FIG. 9.

```
1.  router DemoTemperatureRouter#1.0.1-ternary {
2.
3.      domain TemperatureRouter.Broadcast#V1 {
4.
5.          schema Temperature {
6.              attribute Temperature {
7.                  type     = double;
8.                  label    = "Fahrenheit";
9.                  format   = "0.00 F";
10.             }
11.             attribute TimeStamp {
12.                 type     = datetime;
13.                 label    = "TimeStamp";
14.             }
15.             attribute Status {
16.                 type     = string;
17.                 label    = "Status";
18.             }
19.         }
20.     }
21.
22.     domain TemperatureRouter.Signal#V1 {
23.
24.         schema Temperature {
25.             attributes [
26.                 double        Temperature "Fahrenheit" "0.00 F",
27.                 double        Celsius "Celsius" "0.00 C";
28.                 string        Status;
29.                 datetime      TimeStamp;
30.             ]
31.         }
```

-continued

```
32.      }
33.
34.      ruleset BroadcastRuleSet TemperatureRouter.Broadcast#V1 {
35.
36.          metadata [
37.              Signal : "Signal"
38.              ContentType : "content-type"
39.          ]
40.
41.          rule DropBelowFreezing double {
42.              if (Attribute == "Temperature" && Value < 32.00) {
43.                  drop;
44.                  terminate;
45.              }
46.          }
47.
48.          rule ForwardTemperature {
49.              if (Attribute == "Temperature" ) {
50.                  forward;
51.              }
52.          }
53.
54.          rule Basic double {
55.              if (Attribute == "Temperature") {
56.                  accept {
57.                      [
58.                          ContentType = "text/plain"
59.                      ];
60.                      => (Domain, Entity, Attribute, Value) @ EventTime;
61.                      => (Domain, Entity, "TimeStamp", EventTime) @ EventTime;
62.                  }
63.              }
64.          }
65.
66.          rule Signal double {
67.
68.              if ( Attribute == "Temperature" && Signal == "true" ) {
69.                  accept {
70.                      => ("TemperatureRouter.Signal#V1", Entity, Attribute, Value)
71.                              @ EventTime;
72.                      => ("TemperatureRouter.Signal#V1", Entity, "Celsius",
73.                              (Value – 32.0) * (5.0/9.0)) @ EventTime;
74.                      => ("TemperatureRouter.Signal#V1", Entity, "Status",
75.                              (Value <= 165.0)
76.                              ? "Uncooked"
77.                              : (Value >= 166.0 && Value <= 180.0)
78.                                  ? "Cooked"
79.                                  : "Burned"
80.                              ) @ EventTime;
81.                      => ("TemperatureRouter.Signal#V1", Entity, "TimeStamp", EventTime)
82.                              @ EventTime;
83.                  }
84.              }
85.          }
86.      }
87. }
```

In the above sample rules file, lines 3-20 define a domain with a domain name of "TemperatureRouter.Broadcast" version "V1" and its associated schema, with attribute(s) and data types. Lines 34-86 is a declaration for ruleset "BroadcastRuleset" for domain "TemperatureRouter.Broadcast #V1". Lines 41-46 is a rules declaration called "DropBelowFreezing", where on line 42, there is a conditional clause that if evaluated to be true by the Domain Rules Evaluation Engine 1230, will then execute the instruction on lines 43 and 44. This rule in effect states that if the incoming event's Attribute has a value of "Temperature" and the Value element of the event message quadruple (Domain, Entity, Attribute, Value) is less than 32.00, the event should be dropped and no further evaluation of rules should take place, in effect filtering out events that meet logical criteria.

For rule "Signal" at lines 66-85 the '=>' operator or command on lines 72-73, is an instruction for the Event Router 720, to emit a quadruple event message, for the given Domain "TemperatureRouter.Signal #V1", Entity values, and where the Attribute 3120 element is given a value of "Celsius" and the Value 3125 element of the quadruple is a conversion that takes the Value 3125 of the incoming event message and converts it from Fahrenheit to Celsius. The 'emit' instruction on lines 70, 72, 74 and 81 will only execute if the incoming quadruple event message's Attribute 3120 element has a value of "Temperature" and the "Signal" header element is true. If the incoming quadruple event message is for the battery level, then the Attribute 3120 element has a value of "BatteryLevel" which on line 68 would evaluate to false, consequently the temperature conversion will never take place, and no quadruple event message will be routed.

The router instructions file 845 is a binary representation of instructions and allows the Event Router 720 to evaluate incoming quadruple event message data 3100, using the defined instructions. The format of an instruction takes the general format of a 3-tuple, of (operand code, argument 1, argument 2). The Operand Code determines the number of arguments. The router instructions file 845 supports the following operands, but not limited to:

| None | Bool | String | Integer | Double |
|------|------|--------|---------|--------|
| Char | Binary | Identifier | BinaryOperator | UnaryOperator |
| Function | Header | KeyValue | Message | GotoOperator |
| ConditionalOperator | | | | |

For the input "a=5+6;", the rules compiler 710 translates it to the following set of instructions:

| Operand | Argument 1 |
|---------|-----------|
| Integer | 5 |
| Integer | 6 |
| BinaryOperator | + |
| Identifier | "a" |
| BinaryOperator | = |

The rules compiler 710 is unique, which is configured to only compile input for the specific event rules grammar. As a result, the rules compiler 710 is not used as a general-purpose tool to compile other grammars or languages. The rules compiler 710 is tied to the grammar specification of rules file 810 and its grammatical constructs as depicted in FIG. 9, of the UML class diagram. In an embodiment, the rules compiler 710 is configured to operate using the grammar specification and constructs in the domain rules file 810. This implementation is different from conventional compilers that is implemented to compile instructions based on standard or general-purpose programming grammars and languages. The rules grammar treats the quadruple Event Data 3100 (Domain, Entity, Attribute, Value) elements as first-class variables, upon which rule evaluation can occur.

The sample domain rules file enables the Event Router 720 to route an event based on the values of the quadruple of the Domain 3110, the Entity 3115, the Attribute 3120, and the Value 3125.

Process Overview

Figure 10:
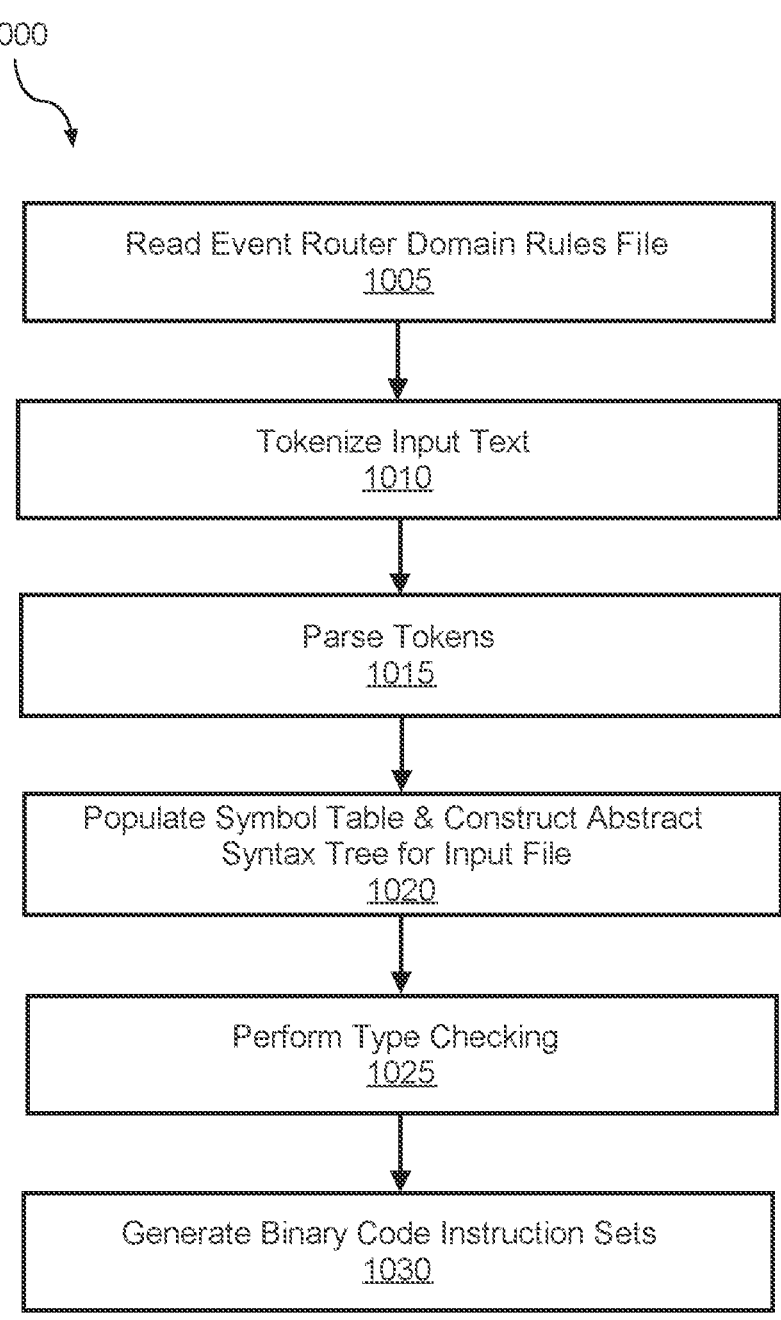
FIG. 10 illustrates a flowchart for compiling a source text file into binary router instructions, in accordance with an embodiment of the present disclosure.

FIG. 10 illustrates an exemplary flowchart of a rule compiler 710 reading a textual rules file 810, in accordance with an embodiment of the present disclosure. The rule compiler 710 is performed by a single rule compiler 710 instance or multiple instances. For clarity, the operations of FIG. 10 are described as performed by the rule compiler 710 and its components and process 1000 are described in terms of a single entity.

At operation 1005, the process 1000 reads an Event Router domain rules file 810. In an embodiment, the rules file 810 may specify that the domain definition is to be sourced from the Domain Registry 740, in which case, operation 1005 will make the appropriate requests. In an embodiment, the rules compiler 710 receives and reads the textual contents of the domain rules file 810. At operation 1010, process 1000 converts the rules file 810 into a series of tokens as defined in the grammar specification. In an embodiment, the rules compiler 710 converts the rules file 810 into a series of tokens that signify their lexical scope. For example, input text "a=5+6", the tokenized representation would be ['a': identifier, ASSIGN, 5: integer, PLUS, 6: integer]. The tokenization of the input file is done by the Lexical Scanner 815. During the conversion operation 1010, if the domain rule file 810 does not conform to the lexical structure of the underlying grammar, then the rules compiler 710 generates an appropriate syntax error message. For example, given input text of "a=5^6", the "^" (i.e., caret character) is not defined as part of the underlying Event Router grammar, the rule compiler 710 determines this to be an error and issue a syntax error message.

At operation 1015, process 1000, parses the series of tokens and determines whether the tokens conform to the sentence structure of the underlying grammar, as depicted in the UML diagram in FIG. 9. In an embodiment, the rules compiler Parser 820 parses the series of tokens and determines whether the tokens conform to the sentence structure of the underlying grammar. If a token does not conform to the sentence structure as determined by the Parser 820, then the rules compiler 710 generates an error message. For example, if the input contained the word 'domain', followed by the name of the domain, followed by an optional '#' symbol, followed by a version number, followed by an opening brace '{' character, then the input would be considered by the rules compiler 710 as a valid sentence structure. The lexical input at process 1010 produces the following sequence of tokens: ['domain': keyword, 'Temperature': DomainName, '#': At, 'V1': Version, '{': LBrace], which is used as input for operation 1015 to determine validity of adherence to the parse grammar.

At operation 1020, the process 1000 populates a Symbol Table 825 and constructs an Abstract Syntax 830 tree. In an embodiment, the rules compiler 710 populates a symbol table and constructs an abstract syntax tree. In an embodiment, the rules compiler 710 populates the symbol table with all the identifiers and variables in the input rules file 810. The quadruple event message of (Domain, Entity, Attribute, Value) are also inserted into the symbol table. The symbol table will consequently have entries in the table for "Domain", "Entity", "Attribute" and "Value", in addition to any other variables and header data.

At operation 1020, the rules compiler 710 constructs a tree representation for a valid grammar sentence. The Abstract Syntax Tree 830 (AST) is a semantic representation of the parsed series of tokens. For the input text of "a=5+6;" an embodied rules compiler 710, at operation 1020, constructs the following AST in working memory as depicted in FIG. 11.

Once the parsing phase is complete and no errors are detected, the process 1000 proceeds to operation 1025. At operation 1025, the process 1000 performs Type Checking 835 operations to ensure that the data types are compatible with their associated operations. In an embodiment, the rules compiler 710 performs type checking on the data types (numeric, text, binary, character, date and boolean) to ensure that the data types and their associated operations are compatible. For example, if the operator is the logical AND, meaning that both the left and the right operand of the AND operator must be of type boolean, where the value of either operand can only be 'true' or 'false'. The following would be an invalid expression "5 AND 6", because neither 5 nor 6 are of data type boolean or represent true or false, they are of type integer, however the following expression "5<6 AND 7>4" is a valid expression because the sub-expressions of "5<6" and "7>4" are of type boolean, i.e., they are either true or false.

At operation 1030, the process 1000 the Code Generation 840 subcomponent, generates a set of router instructions 845. In an embodiment, the rules compiler 710 generates a set of instructions based on the AST that is created at operation 1020. For example, given the abstract syntax tree depicted in FIG. 11, the process 1000, at operation 1030, generates the following set of instructions:

| Integer | 5 |
| Integer | 6 |
| BinaryOperator | + |
| Identifier | "a" |
| BinaryOperator | = |

The binary instructions 845 are evaluated by the Event Router 700 Domain Rules Evaluation Engine 1230 if the compiler is for a Virtual Machine, otherwise the instructions generated will be in the native instruction set for the target device.

Event Router 720

Structural Overview

Figure 12:
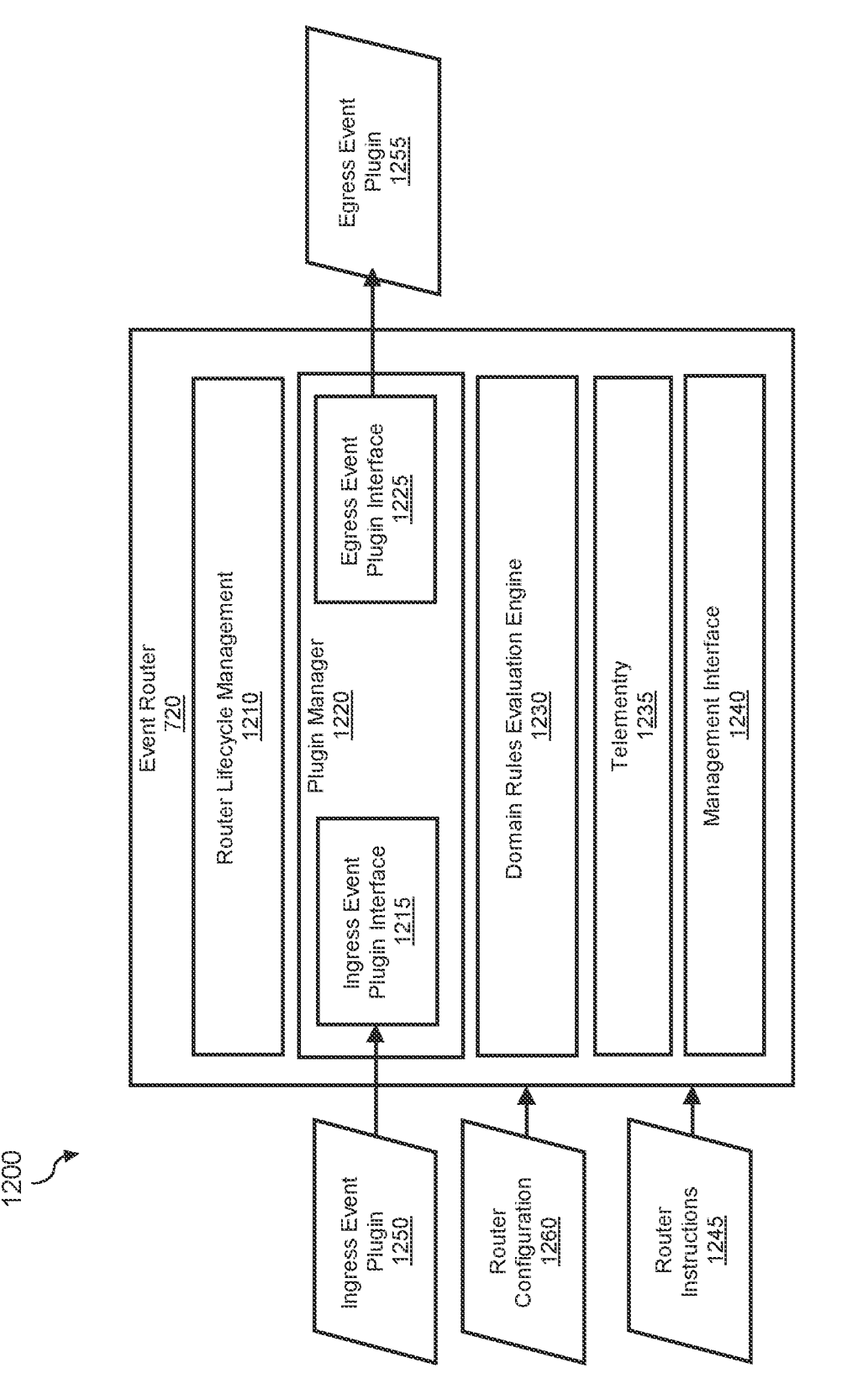
FIG. 12 is a block diagram depicting an embodiment of an Event Router, configuration file, executable instructions, and the logical ingress and egress plugins that are loaded by the Event Router, such as those shown in FIG. 12, in accordance with an embodiment of the present disclosure.

FIG. 12 is a block diagram depicting an embodiment of an Event Router 720, including Ingress 1250 and Egress 1255 plugins that are loaded by the Event Router 720, such as those shown in FIG. 12, in accordance with an embodiment of the present disclosure. FIG. 12 illustrates an example of the different subcomponents that make up the Event Router 720. In one embodiment, the Event Router 720 includes Router Lifecycle Management (i.e., a lifecycle management) 1210, a Plugin Manager 1220, an Ingress Event Plugin Interface 1215, an Egress Event Plugin Interface 1225, a Domain Rules Evaluation Engine (i.e., an evaluation engine) 1230, Telemetry 1235, and a Management Interface 1240. In an embodiment, the Event Router 720 is responsible for at least one of: loading the Router Configuration 1260 file, loading all the configured ingress 1250 and egress 1255 plugins, registering event endpoints, loading the router instructions 845, initiating the Domain Rules Evaluation Engine 1230 to ingest the Event Data 3100, and executing router instructions 845, and to forward, drop or emit the appropriate egress Event Data 3100.

In another embodiment, the Event Router 700, subcomponents may be omitted in favor of a more optimal implementation at the hardware level.

Figure 13:
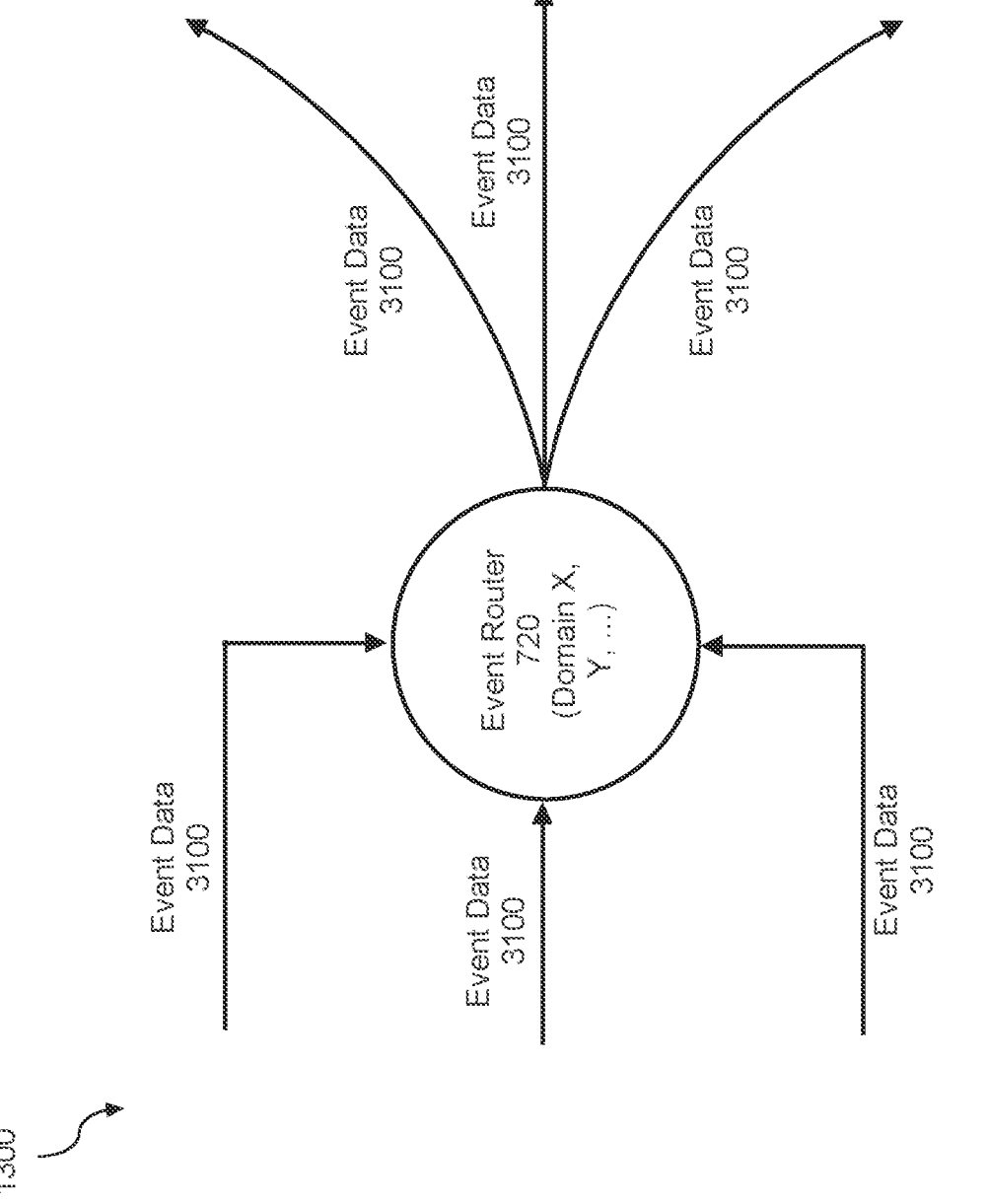
FIG. 13 is a schematic representation of a simple Event Router configuration, where no plugins are defined, implemented to only ingest, and emit event data messages, in accordance with an embodiment of the present disclosure.
Figure 14:
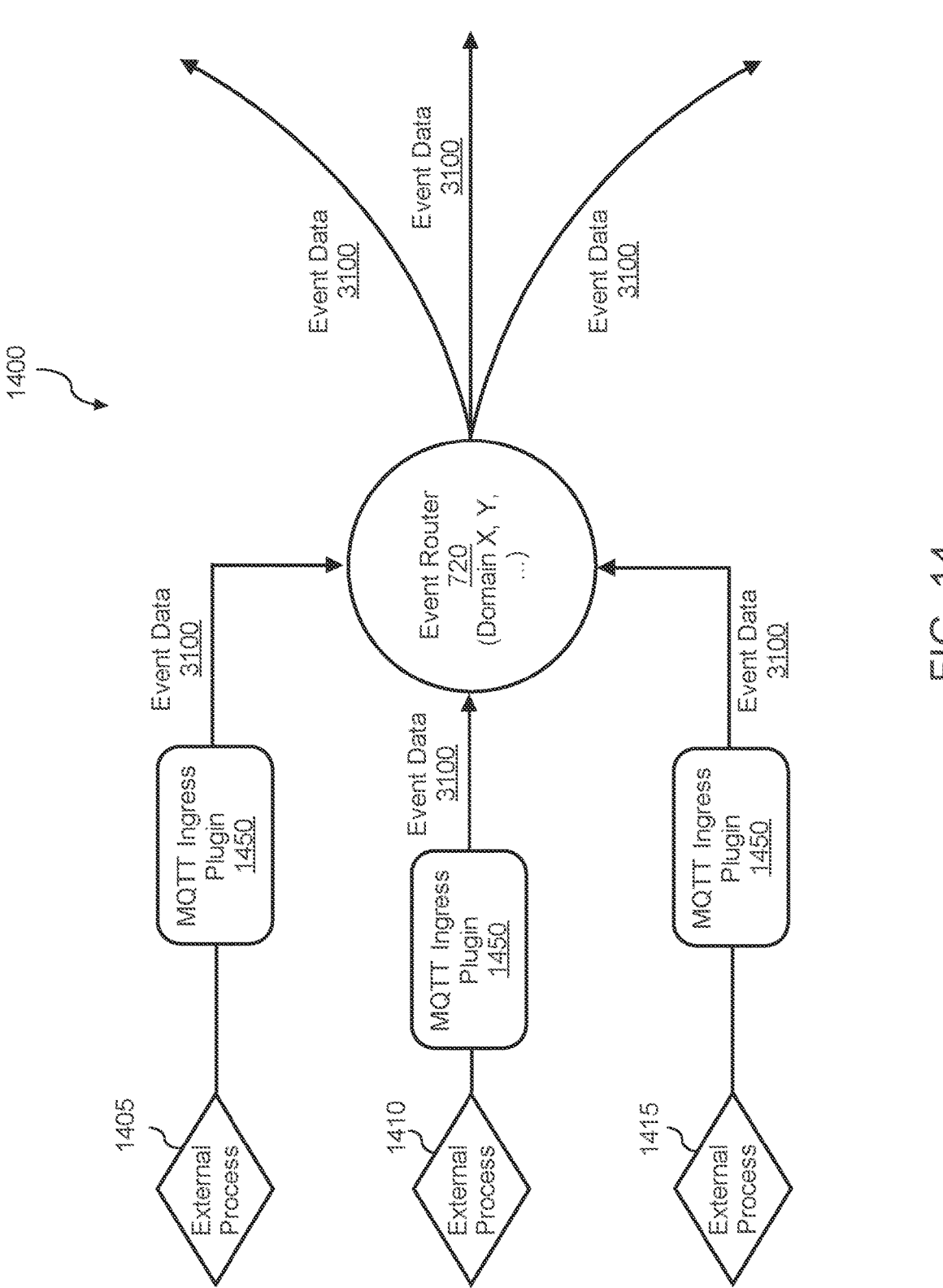
FIG. 14 is a schematic representation of an Event Router configuration with ingress plugins defined, implemented to receive event data from ingress plugins, in accordance with an embodiment of the present disclosure.
Figure 15:
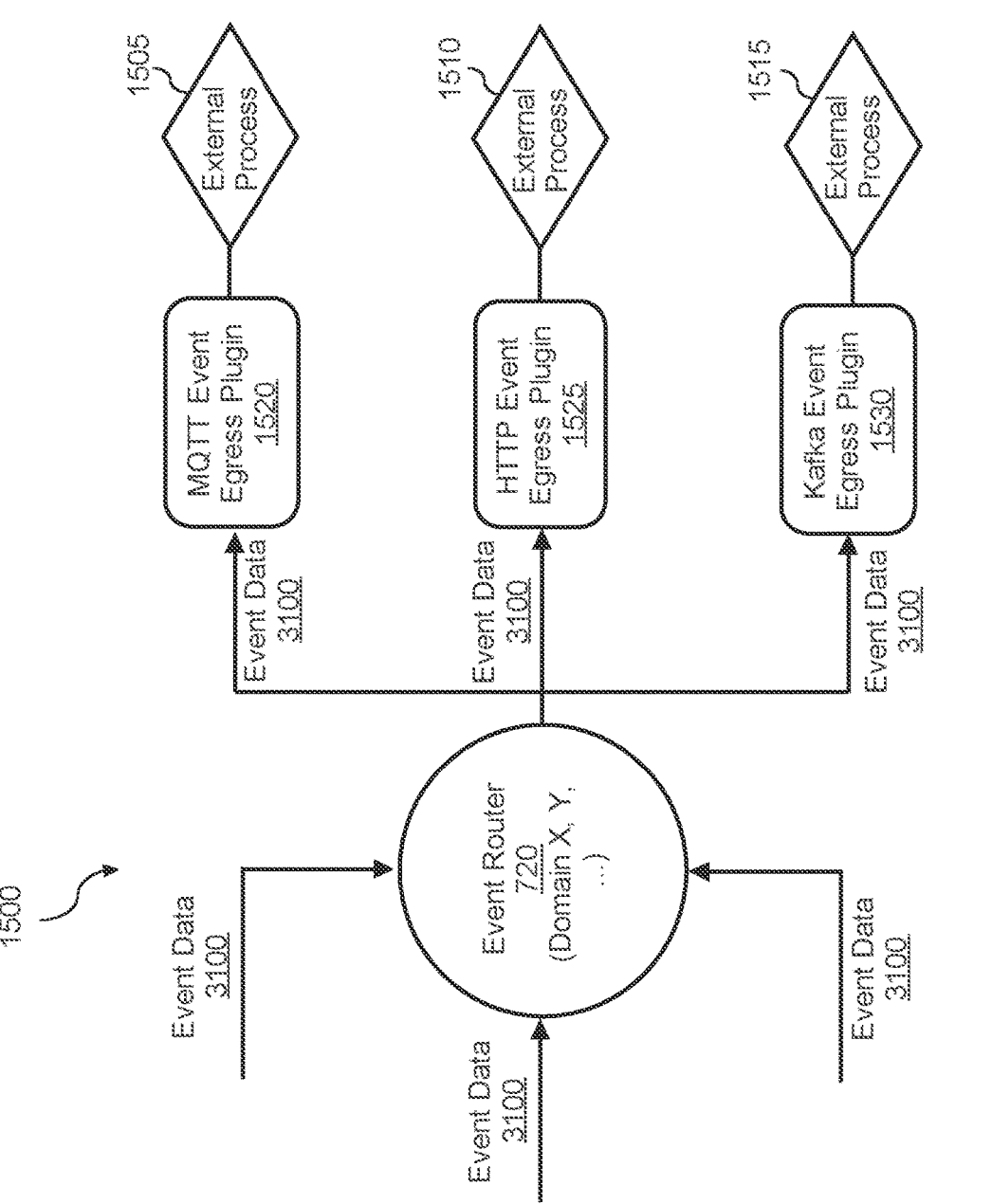
FIG. 15 is a schematic representation of an Event Router configuration with egress plugins defined, implemented to emit event data to egress plugins, in accordance with an embodiment of the present disclosure.
Figure 16:
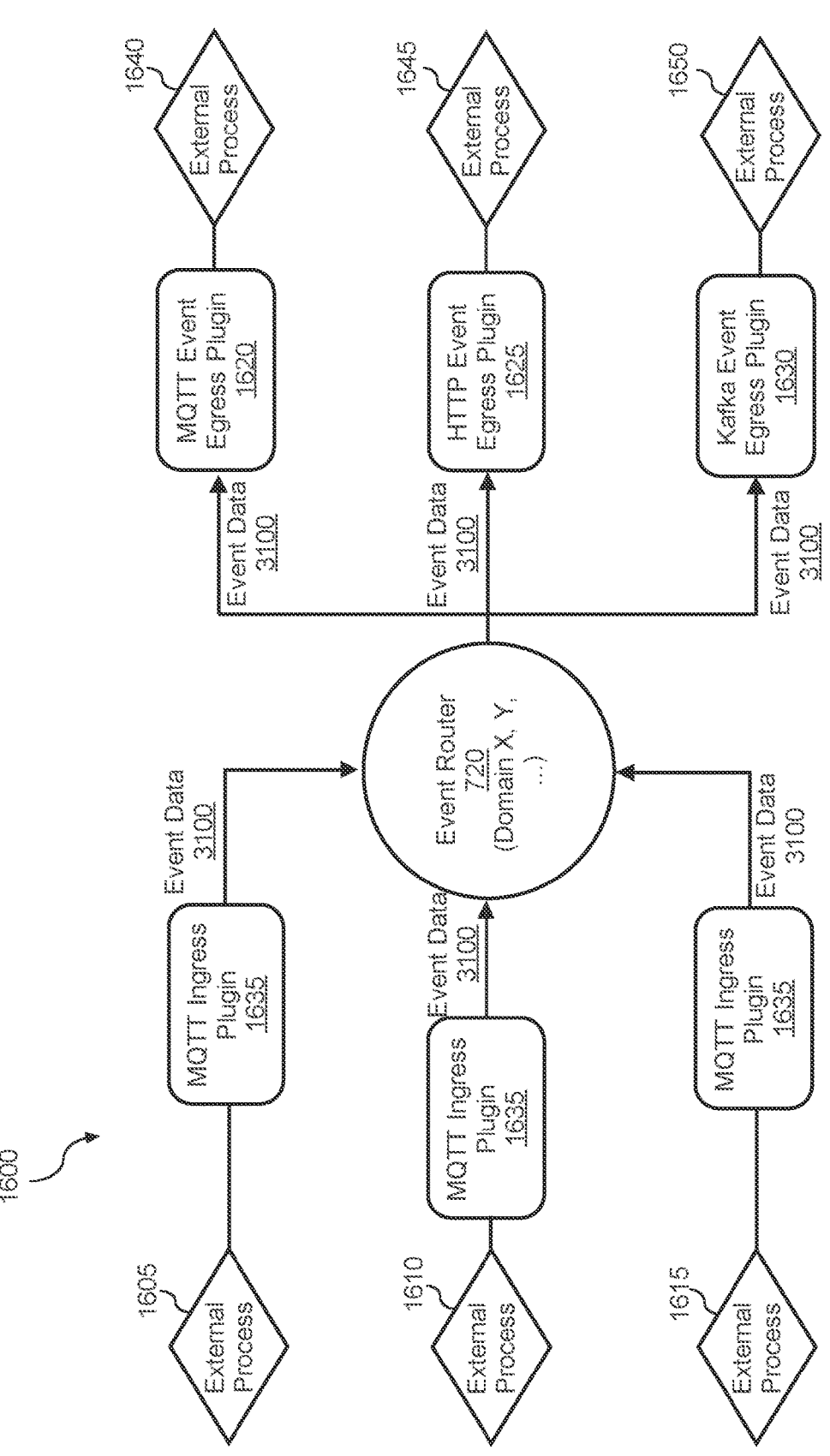
FIG. 16 is a schematic representation of an Event Router configuration with both ingress and egress plugins defined, implemented to receive event data from ingress plugins and to emit event data to egress plugins, in accordance with an embodiment of the present disclosure.

In an embodiment, the Event Routers 720 can include different configurations. The basic configuration, as depicted in FIG. 13, is for an Event Router 720 to only accept incoming Event Data 3100 and emit Event Data 3100. As depicted in FIG. 14, another possible configuration is for an Event Router 720 to launch ingress plugins 1250 for obtaining data from external systems and converting the data to Event Data 3100 for consumption by the Event Router 720. FIG. 15 depicts a configuration of an Event Router 720 with egress plugins 1255, whereas as depicted in FIG. 16, a configuration could include both an ingress and egress plugin 1255, where for example the ingress plugin 1250 could ingest event data using and the HTTP protocol and a JSON quadruple event message format, and then route that event to the destination endpoint, using the Domain Endpoint Resolver 750 via the egress plugin 1255 to an external and downstream endpoint.

In an embodiment, the Router Configuration 1260 file of an Event Router 720 determines how, in an embodied instance of an Event Router 720, it will be configured. It determines whether the Event Router 720 will have Ingress Plugins 1250, Egress Plugins 1255, or both. The Router Configuration 1260 file determines the IP address and Port the Event Router 720 will bind to for incoming Event Data 3100. The following is an example of a JSON router configuration 1260 file:

```
1.   {
2.     "PluginRootPath" : "/Binaries/Plugins",
3.     "Plugins": [
4.       {
5.         "PathType": "Relative",
6.         "Path": "./IngressHttp/IngressHttp",
7.         "Modes": [
8.           {
9.             "Mode" : "Ingress" ,
10.            "Args": "0.0.0.0 5002",
11.            "Enabled": true
12.          }
13.        ]
14.      },
15.      {
16.        "PathType" : "Relative",
17.        "Path" : "./EgressHttp/EgressHttp",
18.        "Modes": [
19.          {
20.            "Args" : "../demoegress-http. json",
21.            "Mode" : "Egress",
22.            "Enabled" : true
23.          }
24.        ]
25.      },
26.      {
27.        "PathType" : "Relative",
28.        "Path" :./ConsoleOut/ConsoleOut",
29.        "Modes": [
30.          {
31.            "Mode" : "Egress",
32.            "Enabled" : false
33.          }
34.        ]
35.      },
36.      {
37.        "PathType": "Relative",
38.        "Path": "./IngressJsonFile/IngressJsonFile",
39.        "Modes": [
40.          {
41.            "Mode" : "Ingress" ,
42.            "Args": "-m ../../../Data/P_ES_74fc39d8_Temperature_
Events_time. json -hsignal=true -d 100000",
43.            "Enabled": true
44.          }
45.        ]
46.      }
47.    ]
48.  }
49.
```

In an embodiment, there is a one Router Configuration 1260 file for every Event Router 720.

FIG. 13 illustrates a router configuration where there are no plugins defined within the router configuration 1660.

FIG. 14 illustrates a router configuration that includes definitions for three ingress plugins 1250. Lines 3 to 47 illustrate how ingress and egress plugins may be defined.

FIG. 15 illustrates a router configuration that includes definitions for three egress plugins 1255. Lines 3 to 47 illustrate how ingress and egress plugins may be defined.

FIG. 16 illustrates a router configuration that includes definitions for three ingresses 1250 and three egress 1255 plugins. Lines 3 to 47 illustrate how ingress and egress plugins may be defined.

Functional Overview

In an embodiment, the Event Router 720 is implemented to ingest incoming Event Data 3100, and for each incoming event, apply the executable domain event router rules instructions 845. The executable domain and rules specifications determine how events are normalized, transformed, and routed.

In one embodiment, the Event Router's 720 Domain Rules Evaluation Engine 1230 may be implemented as a virtual machine to execute the instructions contained within the Router Rules Instructions 845. This instruction set 845 may be loaded at startup or dynamically when a change in the instructions file 845 is detected. The virtual machine runtime may then construct a symbol table from the domain definition in the data segment of the binary file, as well as any environment or variables defined. When an event is ingested by the Event Router 720, the values of the quadruple event message of (Domain, Entity, Attribute, Value) 3100 may be inserted into the symbol table in addition to any header information or variables. The virtual machine is then triggered to execute the instructions from the code segment of the binary file.

In an embodiment, the Router Lifecycle Management 1210 subcomponent is implemented to ensure that the different subcomponents including the Plugin Manager 1220, Domain Rules Evaluation Engine 1230, Telemetry 1235, and the Management Interface 1240 are started and stopped in the correct order. The Router Lifecycle Management 1210 acts as the orchestrator and communicator between the different subcomponents. In an embodiment, when a new rules instruction file 845 is made available, the Router Lifecycle Management 1210 subcomponent signals to the Domain Rules Evaluation Engine 1230, to load a new instruction file whenever the file changes. This subcomponent implements a file watcher, which detects the presence of a new Router Configuration 1260 or instruction 845 file. In an embodiment, the Router Lifecycle Management 1210 subcomponent notifies the Plugin Manager 1220 of a change in the Router Configuration 1260, so that the Plugin Manager 1220 can load and bind the plugins specified in the Router Configuration 1260.

In an embodiment, the Plugin Manager 1220 subcomponent is implemented to load Ingress Event 1250 plugins and Event Egress 1255 plugins and binding the plugin(s) to the Ingress Event Plugin Interface 1215 and binding plugin(s) to the Egress Event Plugin Interface 1225. Once the plugins are loaded as determined by the Router Configuration 1260 file, the Plugin Manager 1220 signals the Router Lifecycle Management 1210 subcomponent that it has completed the loading and binding of the plugins. Embodied instances of plugins 1250 and 1255 are code libraries that implement the respective Ingress Event Plugin Interface 1215 and Egress Event Plugin Interface(s) 1225. The plugins extend the functionality and capability of an embodied Event Router 720. In an embodiment, the Event Ingress Plugin 1250 and Event Egress Plugin 1255 allow external systems to send Event Data 3100 into and out of the Event Router 720. The purpose of Ingress and Egress plugins is to extend the functionality of the Event Router 720 by allowing interaction with external systems in the exchange of event data.

In an embodiment, the Domain Rules Evaluation Engine (i.e., the evaluation engine) 1230 loads the router instructions 845 file and waits for incoming Event Data 3100. Upon receipt of incoming Event Data 3100, the evaluation engine 1230 executes the binary instructions 845 for each incoming event. The actions performed against an incoming event is dependent upon the content of the rules instructions 845 provided at runtime for an embodiment. The rules instructions 845 can provide normalizing, validating, transforming, and routing capabilities. It is the function of the evaluation engine 1230 to faithfully execute the given instructions. What is unique about this approach is that normalization, transformation, filtering, and routing occurs at the event level, based upon the values of the incoming event quadruple of Domain 3110, Entity 3115, Attribute 3120, and Value 3125.

For a given Attribute 3120 of the Domain 3110, the Value 3125 is "routed" for the given Entity 3115 to the specified Domain 3110 value. For each incoming event 3100, the Event Router 720 process loads in the values for the event (domain, entity, attribute, value), and applies the rules that are relevant for that event.

For example, a red automobile with a registration number of AX1345T may be expressed in quadruple form of (Domain, Entity, Attribute, Value) as ("Car", "AX1345T", "Color", "Red"), where "Car" is the Domain, "AX1345T" the Entity, "Color" the Attribute, and "Red" is the Value. The registration number identifies a unique instance of a car, and therefore represents the "Entity" in question. The "Car" domain may contain many more attributes besides "Color". Each of the other attributes can be assigned a value in a similar manner. A car with registration number "AX1345T", with 215 Horsepower engine, is expressed in event quadruple form as ("Car", "AX1345T", "Horsepower", 215). In this instance the Domain Rules Evaluation Engine 1230 will route the quadruple event message to the endpoint IP address where there is an endpoint that can accept a quadruple event message for the Domain of "Car".

In an embodiment, if an incoming event message 3100 includes a Domain 3110 value for a domain that is not defined in the domain section of the Domain Event Router Rules File 810, then the incoming event will be dropped, and the process will wait for the next event. A secondary check is performed to ensure that the Attribute 3120 element of the incoming event message is an attribute that exists within the domain for the value in the domain element. A tertiary check is done to ensure that the data type of the incoming event conforms to the data type of the Domain and Attribute. The following domain definitions are used to illustrate how routing occurs.

```
1.    domain TemperatureRouter.Broadcast#V1 {
2.
3.        schema Temperature {
4.            attribute Temperature {
5.                type = double;
6.                label = "Fahrenheit";
7.                format = "0.00 F";
8.            }
9.        }
10.   }
11.
12.   domain TemperatureRouter.Signal#V1 {
13.
14.       schema Temperature {
15.           attributes [
16.               double  Temperature "Fahrenheit" "0.00 F";
17.               double  Celsius "Celsius" "0.00 C";
18.               string  Status;
19.           ]
20.       }
21.   }
```

Figure 17:
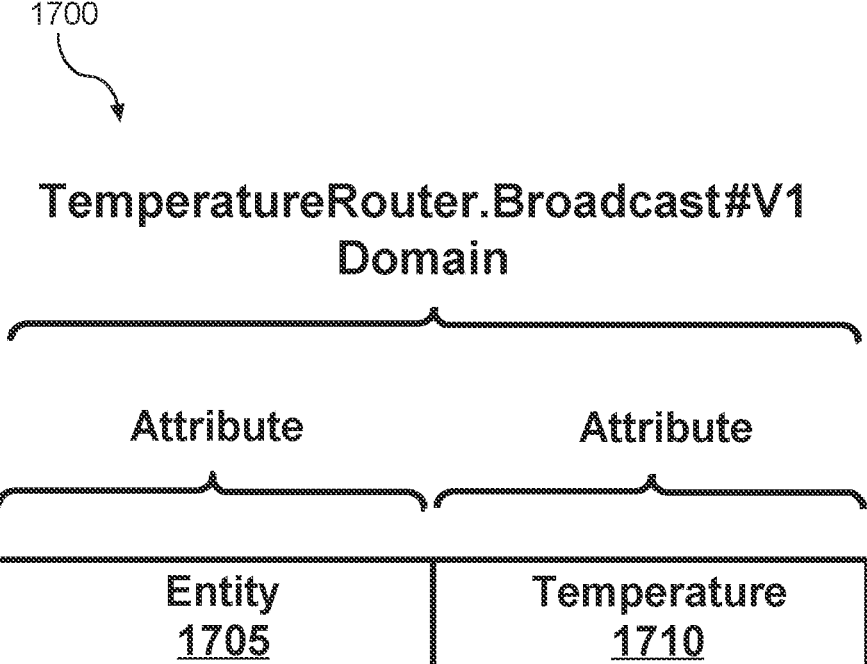
FIG. 17 depicts an embodied instance of a domain definition for a temperature sensor with two Domain Attributes.

The above domain definitions are logically represented in FIG. 17 and FIG. 18.

In an embodiment, the Event Router 720 is associated with one or more domains and only accepts incoming events for that domain. All events for domain "TemperatureRouter.Broadcast #V1" are routed to router instances that are configured for that domain, similarly for domain "TemperatureRouter.Signal #V1". An incoming event with the following (Domain, Entity, Attribute, Value) values of ("TemperatureRouter.Signal #V1", "UT524", "Status", "Warming Up") is routed to an Event Router 720 that is configured to accept events for the "TemperatureRouter.Signal #V1" domain. The Value of "Warming Up" is routed to the "Status" attribute for entity "UT524". Conceptually this can be represented in tabular form as:

| Domain: TemperatureRouter.Signal#V1 | | | |
|---|---|---|---|
| Entity | Temperature | Celsius | Status |
| UT524 | | | Warming Up |

For an event routed to: ("TemperatureRouter.Signal #V1", "UT524", "Temperature", 97.03), can be visualized as:

| Domain: TemperatureRouter.Signal#V1 | | | |
|---|---|---|---|
| Entity | Temperature | Celsius | Status |
| UT524 | 97.03 | | |

The Domain 3110 element of the Event Data 3100 targets a running instance of a router server 720 for that domain. Within that domain server, the Entity 3115 conceptually defines a 'row' element, and the Attribute 3120 the 'column' element, and the Value 3125 is then placed at the intersection of the row and column for the domain.

The evaluation engine 1230 maintains a data segment, containing all the variables that are contained within the router instructions 845 file. The data segment contains symbol entries for Domain, Entity, Attribute and Value, and any other symbols defined in the rules file 810 that is then compiled into router instructions 845. The data segment could be represented in tabular form as:

| Symbol Name | Data Type | Value (e.g.) |
|---|---|---|
| Domain | String | TemperatureRouter.Signal#V1 |
| Entity | String | UT524 |
| Attribute | String | Temperature |
| Value | String, Bool, Integer, Double, Char, Binary | 97.03 |
| . . . Other | | . . . |

The following is a textual representation of the binary Compiled Domain Event Router Rules Instructions 845 for the Data Segment of the instructions file.

```
 1. Ruleset: BroadcastRuleSet TemperatureRouter.Broadcast#V1
 2.         Data Segment:
 3.             Variable Name            Index NodeType         Type
 4.
    ==================================================================================
 5.         Domain                       0000 Identifier        Constant
 6.         Entity                       0001 Identifier        Constant
 7.         Attribute                    0002 Identifier        Constant
 8.         Value                        0003 Identifier        Constant
 9.         EventTime                    0004 Identifier        Constant
10.         Signal                       0005 Identifier        Meta
11.         ContentType                  0006 Identifier        Meta
```

In an embodiment, the Telemetry 1235 subcomponent is implemented to gather data about the executing instance of the Event Router 720, providing statistics on the performance of the Event Router 720. Illustrated below is an example of the statistics gathered by the telemetry 1235 subcomponent.

```
 1. [Router.Events]
 2.     Event Processing Time (ms)
 3.         Domain=TemperatureRouter.Broadcast#V1,Percentile          0
 4.         Domain=TemperatureRouter.Broadcast#V1,Percentile          0
 5.         Domain=TemperatureRouter.Broadcast#V1,Percentile          0
 6.     Events In (Total Count)
 7.         Domain=TemperatureRouter.Broadcast#V1,Total=Accepted    132,681
 8.         Domain=TemperatureRouter.Broadcast#V1,Total=Count       132,681
 9.     Events In Rate (Count / 1 sec)
10.         Domain=TemperatureRouter.Broadcast#V1,Total=Count        1,528
11.
```

The Management Interface 1240 subcomponent provides an application programmable interface (API) in the form of HTTP REST commands, to allows external management and control of an embodied Event Router 720. The API support commands to stop or start a router, to provide, a telemetry snapshot, or to send a new router instruction to be reloaded and executed.

Process Overview

FIG. 19 illustrates an exemplary flowchart of the Router Lifecycle Management (i.e., lifecycle management) 1210 orchestrating the launch of the Event Router 720 subcomponents. The process 1900 sends out notifications to all the subcomponents the Plugin Manager 1220, the Domain Rules Evaluation Engine 1230, Telemetry 1235, and the Management Interface 1240 at various stages in the startup process. In an embodiment of an Event Router 720, the lifecycle management 1210 sends out notifications to subcomponents, but also waits for notifications from subcomponents to determine current state and what the next notification may be. For example, in an embodiment, lifecycle management 1210 waits for notifications from the Plugin Manager 1220, the evaluation engine 1230 and Telemetry 1635 before the lifecycle management 1210 sends out a notification to all subcomponents that the Event Router 720 in now in an "Initialized" state.

At operation 1905, process 1900 broadcasts a "Router Started" notification to all the Event Router subcomponent at startup. This notification is asynchronously acted upon by the other Event Router 720 subcomponents. This notification informs subcomponents of the current router state but could be a trigger for subcomponents to perform actions.

At operation 1910, process 1900, waits for any changes to a router configuration 1260 or rule instruction 845 file. Lifecycle management 1210 subcomponent 'watches' for file changes detected by the operating system. When a file change is detected, at process 1910, the process 1900 broadcasts a "New Configuration Provided" notification Event Router 720 subcomponents, including the Plugin Manager 1220, the Domain Rules Evaluation Engine 1230, and Telemetry 1235, but not limited to. In an embodiment, reacting to changes to the configuration 1260 and rule instructions 845 file, enables dynamic loading at runtime of the new configuration and instructions.

At operations 1915, 1920 and 1925, process 1900 is in a wait state, listening for notifications from other Event Router 720 subcomponents. Process 1900 accepts notifications in any order from the subcomponents. At operation 1915, process 1900, is waiting upon a "Evaluation Engine Ready" notification from the evaluation engine 1230. At operation 1920, process 1900 is waiting upon a "Plugins Loaded" notification from the Plugin Manager 1220. At operation 1925, process 1900 is waiting upon a "Telemetry Running" notification from Telemetry 1235. The process 1900 needs to receive all three notifications at operations 1915, 1920 and 1925 before it can proceed to the next operation.

At process 1930, process 1900 will broadcast "Router Initialized" to the Event Router 720 subcomponents once all the necessary notifications have been received (depicted by operations 1915, 1920 and 1925). The broadcast of this notification is an indicator to the Event Router 720 subcomponents that the router has successfully started and that all subcomponents are ready to perform their respective functions at which point process 1900 goes into a wait state waiting for any notifications from the subcomponents.

FIG. 20, process 2000, illustrates an exemplary flowchart of the Event Router Plugin Manager 1220 subcomponent loading and binding ingress and egress plugins and readying them to ingest and egress Event Data 3100, according to an embodiment.

At operation 2005, process 2000 waits for receipt of a "Router Started" notification from lifecycle management 1210. At operation 2010, process 2000 loads the plugin section of the router configuration 1260 file. If any plugins are defined in the configuration file, then the Plugin Manager 1220 proceeds to the next operation. Below is an exemplary Router Configuration to load ingress and egress plugins.

```
 1. "PluginRootPath" :
    "D:/Development/layer9Labs/_LaunchApps/Binaries/Plugins",
 2. "Plugins" : [
 3.    {
 4.      "PathType" : "Relative",
 5.      "Path" : "./IngressHttp/IngressHttp" ,
 6.      "Modes" : [
 7.        {
 8.          "Mode" : "Ingress",
 9.          "Args" : "0.0.0.0 5002",
10.          "Enabled" : true
11.        }
12.      ]
13.    },
14.    {
15.      "PathType" : "Relative",
16.      "Path"    : "./EgressHttp/EgressHttp ",
17.      "Modes" : [
18.        {
19.          "Args"  : ". ./demoegress-http.json",
20.          "Mode" : "Egress",
21.          "Enabled" : true
22.        }
23.      ]
24.    }
25. ]
26.
27.
```

At operation 2015, the process 2000 loads the binary executable plugins 1250 and 1255 specified in the router configuration 1260 file into working memory for an embodiment on an executing Event Router 720. At operation 2020, process 2000 invokes the "Launch" method on each of the loaded plugin interfaces. This ensures that the plugins are in a ready state to ingest or emit Event Data 3100. At operation 2025, process 2000 broadcasts a "Plugins Loaded" notification to the Event Router's 720 subcomponents including the lifecycle management 1210, the Plugin Manager 1220, the Domain Rules Evaluation Engine 1630, and Telemetry 1235. At operation 2030, process 2000 waits for a "Router Initialized" notification from the lifecycle management 1210 subcomponents.

At operation 2035, process 2000, upon receipt of "Router Initialized" notification, sets its internal state to "Accepting Events" which allows for ingress and egress events to be received and sent. At operation 2040, process 2000 waits for a "Router Shutdown" notification from the lifecycle management 1210. This is an asynchronous notification and can happen at any time that the Event Router 720 process is terminating. At operation 2045, process 2000, stops incoming events to an active plugin, and completes processing of outgoing events.

Figure 21:
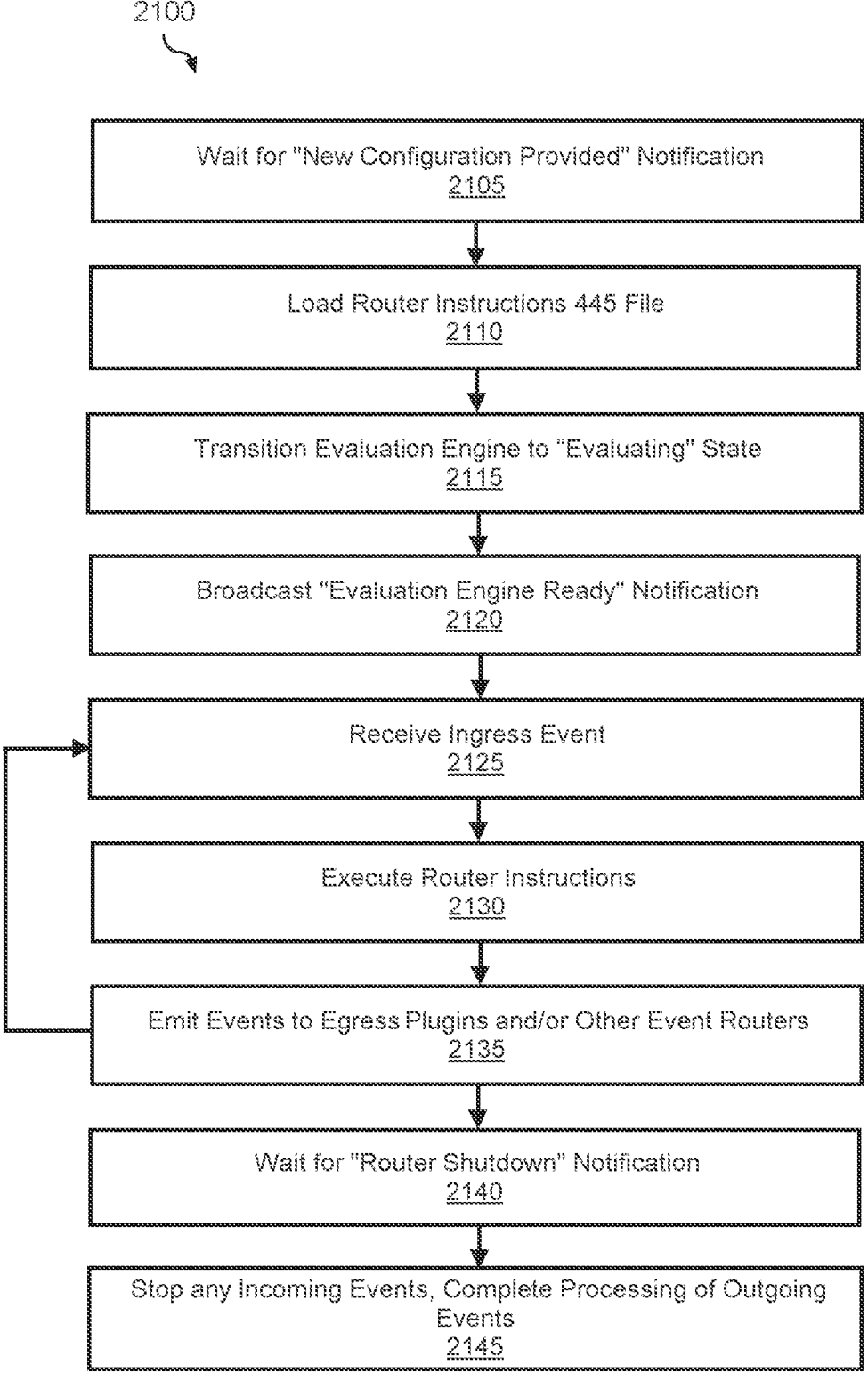
FIG. 21 illustrates a flowchart for receiving and sending events, and executing router instructions, in accordance with an embodiment of the present disclosure.

FIG. 21, process 2100, illustrates an exemplary flowchart of the Domain Rules Evaluation Engine 1230, loading the router instructions 845, waiting for incoming Event Data 3100, receiving an event message, executing the router instructions, which may result in new Event Data 3100 being emitted, in accordance with an embodiment of the present disclosure. At operation 2105, process 2100 waits "New Configuration Loaded" notification from the lifecycle management 1210 before proceeding to the next operation. At operation 2110, the process 2100 loads router instructions 845 file into working memory. At operation 2115, process 2100, sets internal state to "Evaluating", upon successful router instruction load operation. At operation 2120, process 2100 broadcasts "Evaluation Engine Ready" to all the Event Router 720 subcomponents and goes into a wait state for incoming Event Data 3100.

At operation 2125, process 2100 receives an incoming event 3100, assigns the values of (Domain, Entity, Attribute, Value) from the incoming quadruple event to the equivalent symbols in the data segment of the router instructions. For example, for the incoming quadruple Event Data 3100 of ("TemperatureRouter.Broadcast #V1", "Probe01", "Temperature", 75.78) the values the quadruple is bound to the corresponding symbols in the data segment, as follows:

| Symbol Name | Data Type | Value |
| --- | --- | --- |
| Domain | String | "TemperatureRouter. Broadcast#V1" |
| Entity | String | "Probe01" |
| Attribute | String | "Temperature", |
| Value | Double | 75.78 |
| . . . Other | | |

At operation 2130, process 2100 executes the router instructions 845 for a given rule. For example, given the following rule:

```
1. rule DropBelowFreezing double {
2.    if (Attribute == "Temperature" && Value < 32.00) {
3.       drop;
4.       terminate;
5.    }
6. }
```

At line 2, the value of the symbol 'Attribute' is looked up by the evaluation engine 1230 in the data segment table of the ruleset for the domain 3110, which in this example would be "Temperature". Similarly, for the 'Value' symbol. The condition at line 2 will not be true, since the value of the 'Value' symbol in the data segment is 75.78 which is greater than 32.00, therefore the statements on lines 3 and 4 will not be executed by the evaluation engine 1230. The evaluation engine 1230 processes all rules that were defined in router instructions 845 for the domain.

At operation 2135, process 2100 emits event messages that specified in the rule instructions 845. Whether or not event messages are emitted depends upon the contents of the rules file 810 and its binary representation router instructions 845. For the following rules, no event messages will be emitted, since there is no event emit statement in the rule definition.

```
1. rule DropBelowFreezing double {
2.    if (Attribute == "Temperature" && Value < 32.00) {
3.       drop;
4.       terminate;
5.    }
6. }
7.
```

However, for the following rule definition

```
1. rule Basic double {
2.    if (Attribute == "Temperature") {
3.       accept {
4.          [
5.             ContentType = "text/plain"
6.          ];
7.          => (Domain, Entity, Attribute, Valve);
8.       }
9.    }
10. }
11.
```

Line 7 contains the '=> (domain, entity, attribute, value);' event emit statement, resulting in a single event to be emitted if the condition at line 2 evaluates to true. Unless there is a "Router Shutdown" notification message, the process 2100 loops and resumes execution at operation 2125, waiting for the next incoming event message 3100.

At operation 2140, process 2100 waits for a "Router Shutdown" notification before proceeding to operation 2145. At operation 2145, the process 2100 stops processing incoming Event Data 3100, completes processing for outgoing Event Data 3100 and then stops processing any incoming and outgoing events.

Figure 22A:
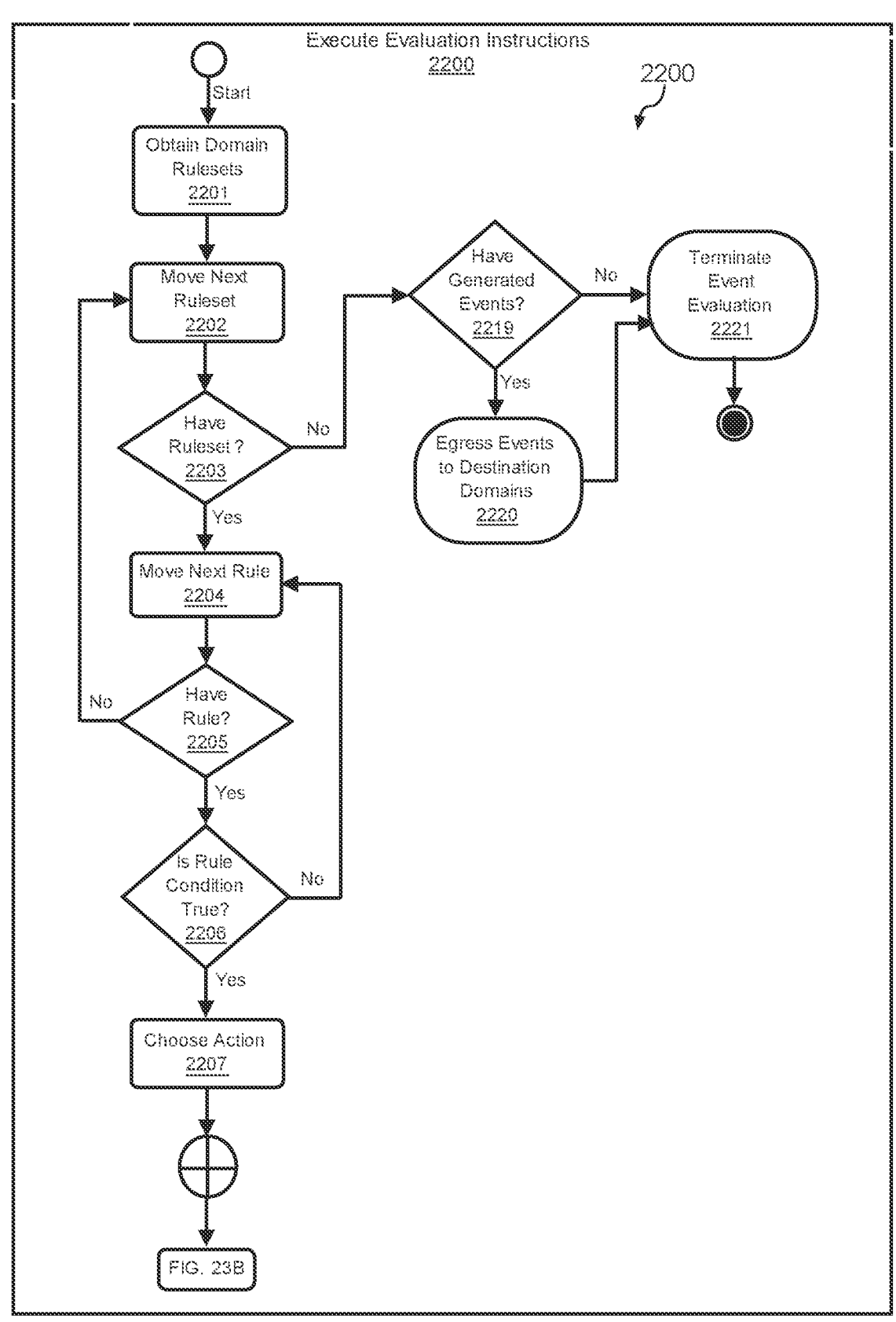
FIGS. 22A and 22B illustrate a flowchart for executing an incoming event by the Event Router, in accordance with an embodiment of the present disclosure.
Figure 22B:
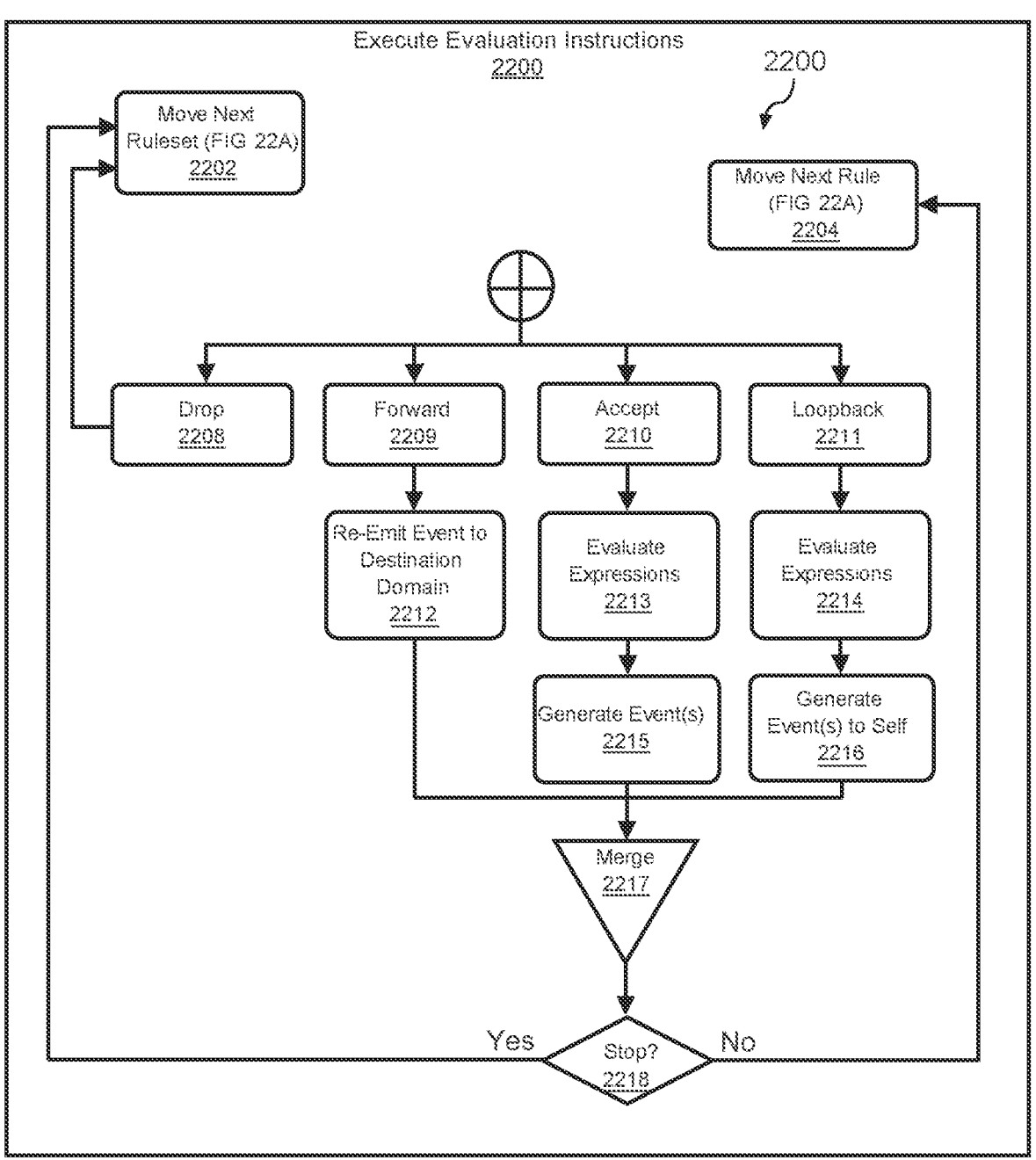

FIG. 22 (collectively including FIGS. 22A and 22B), process 2200, represents a detailed execution flow for operation 2130 of process 2100, outlining the different execution paths an event may go through based upon the rules file 810 and its compiled binary representation 845. At operation 2201, process 2200 obtains the set of rules for the domains for which this router is configured to receive events for. At operation 2202, the process 2200 positions the evaluation engine 1230 to the first ruleset. The operation 2100 is an iterator that moves to the next ruleset upon each invocation, until there are no more rulesets for the configured domain.

At operation 2203, the process 2200 tests to determine if operation 2100 moved beyond the collection of rulesets and have come to the end of the ruleset collection. If there is a valid ruleset (i.e., at operation 2203) then execute operation 2204 to move to the first rule in the ruleset. If there are no more rulesets, then execute operation 2219. At operation 2219, the process 2200 checks to see if there are any generated events, if yes, then execute operation 2220, otherwise execute operation 2221 and terminate event evaluation.

At operation 2220, process 2200 emits events to destination domains, then execute operation 2221 and terminate event evaluation. The operation 2204 is an iterator, which goes to the next rule in the collection of rules for the ruleset on each invocation. At operation 2205, the process 2200 determines if the prior operation moved beyond the collection of rules. If there are no more rules, then resume execution at operation 2202, otherwise proceed to operation 2206 for process 2200. At operation 2206, process 2200 evaluates the condition of the rule to determine if the rule body should be executed or not. If the rule condition is false, then resume execution at operation 2204, otherwise execute operation 2207.

At operation 2207, process 2200 executes one of four actions, drop, forward, accept or loopback. At operation 2208, process 2200, if the rule action is drop 2208, then the event is effectively ignored, and execution resumes at operation 2202. At operation 2209, process 2200, if the rule action is forward then at operation 2212, generates the event for the destination domain, then merge execution at operation 2217. If this forward action is associated with a terminating condition set to true at operation 2218, then execution resumes operation 2202 otherwise it resumes at operation 2204.

At operation 2210, process 2200, if the rule action is the Accept action, then execute the expression statements for that rule at operation 2213. The expression statements for a rule may emit additional events, in which case, the events are generated at operation 2215, then merge execution at operation 2217. If this Accept action is associated with a terminating condition then execution resumes at operation 2202, otherwise it resumes operation 2204.

At operation 2211, process 2200, if the rule action is loopback action, then execute the expression statements for that rule at operation 2214. The expression statements for a rule may emit additional events, in which case, the events are generated at operation 2216, then merge execution at operation 2217. If this loopback action is associated with a terminating condition, then execution resumes at operation 2202, otherwise it resumes operation 2204.

Figure 23:
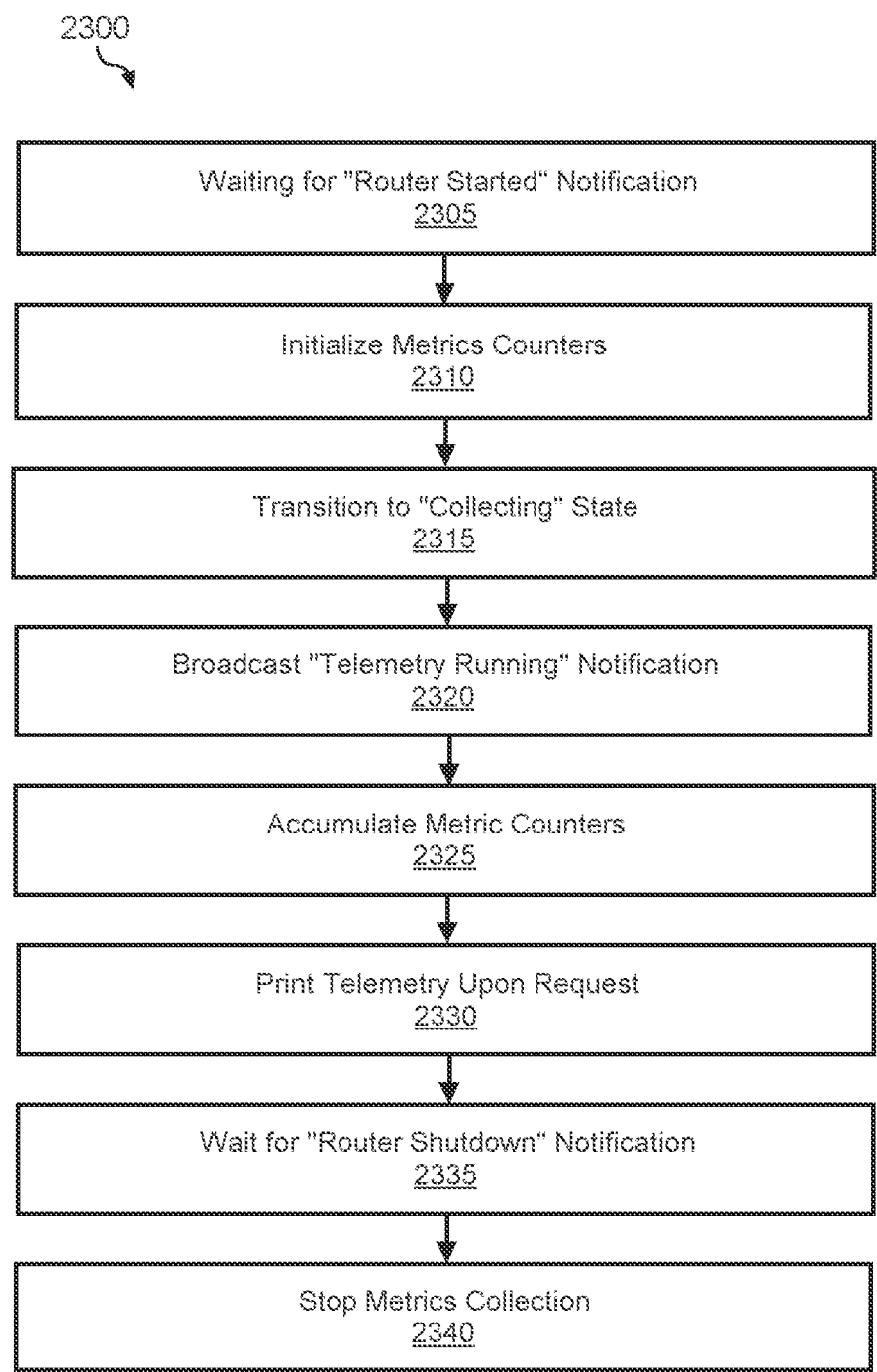
FIG. 23 illustrates a flowchart for collecting and aggregating metrics of the Event Router, in accordance with an embodiment of the present disclosure.

FIG. 23, process 2300, illustrates an exemplary flowchart of the Telemetry 1235 subcomponent of the Event Router 720, initializes the process to collect data, accumulate metric counters, and to display statistical counters on demand, in accordance with an embodiment of the present disclosure. At operation 2305, the Telemetry 1235 subcomponent of process 2300, waits for "Router Started" notification from the Lifecycle Management 1210 subcomponent. At operation 2310, for process 2300, metric counters are initialized, resetting to a known default state. At operation 2315, for process 2300, Telemetry transitions to an internal state of "Collecting" and then broadcasts "Telemetry Running" at operation 2320 of process 2300, to Event Router 720 subcomponents.

At operation 2325, the process 2300 accumulates metric counters for the duration of a running instance on an Event Router 720. For example, process 2300 counts the number of events ingresses, egressed and the average time in milliseconds of how long it has taken to process an event but is not limited to these. At operation 2330, process 2300, upon request, prints out a current snapshot of all the accumulated metric counters at the time of the request to the console. Process 2300 continues accumulating metric counters, until, at operation 2335, a "Router Shutdown" notification is received. At operation 2340, process 2300 stops accumulating metrics, and waits for the Event Router 720 to shut down.

Event Router Management 730

Structural Overview

Managing a collection of Event Routers 720 in an automated manner is more effective than manually administering them. In an embodiment, the Event Router Management 730 is implemented to manage a single or a network of routers. The management operations include at least one of: starting, stopping, and deploying router instructions 845 to one or many Event Routers 720.

Functional Overview

In an embodiment, the Event Router Management (i.e., router management) 730 is implemented to manage a collection of Event Routers 720. The process of starting and stopping an Event Router 720 of updating router instructions 845 at runtime are all activities that are trivial to perform when dealing with a small number of Event Routers 720. Once the number of Event Routers within a network increases, manual management becomes infeasible to do. The ability to apply a command to a collection of Event Routers 720 becomes increasingly necessary. This component makes it possible to dynamically launch additional Event Routers to cope with increased demand, or to shut Event Routers down when demand abates. The router management 730 component provides a REST application programmatic interface (API) for each of the commands that this component will execute. For example, the HTTP REST 'POST' verb with a command of 'stop', with an Event Router 720 identifier, will issue a 'stop' command to the Management Interface of the Event Router 720 for the given Event Router identifier. The Event Router 720 will then start the process of shutting itself down.

Process Overview

Figure 24:
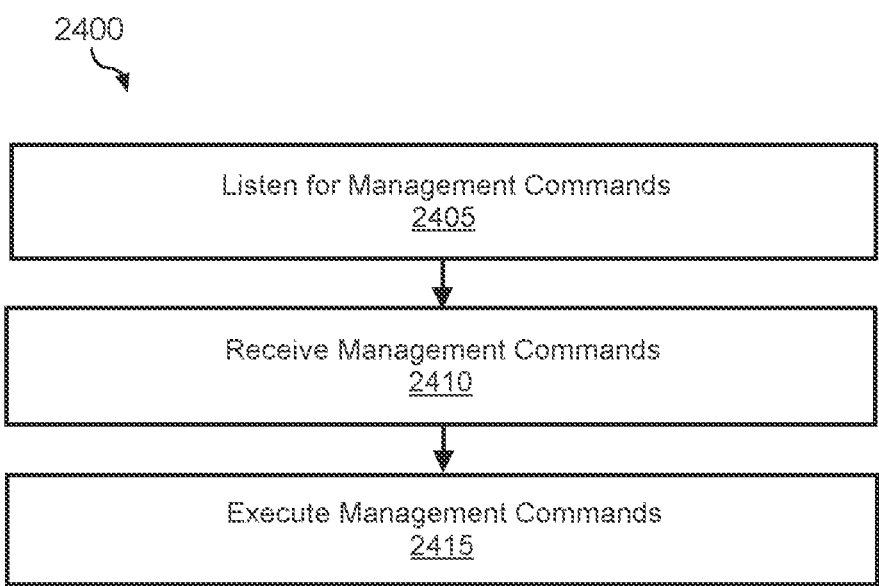
FIG. 24 illustrates a process flow for the Management Interface subcomponent of the Event Router, implemented to provide a HTTP REST programming interface to manage an Event Router, in accordance with an embodiment of the present disclosure.

FIG. 24, process 2400, illustrates an exemplary flowchart of the Management Interface 1240 subcomponent of the Event Router 720.

At operation 2405, process 2400, the Management Interface asynchronously listens for incoming management commands via a HTTP REST based request.

At operation 2410, process 2400, upon receipt of a management command, the Management Interface 1240 will determine the validity of the request. If it is a valid management command, then the request is executed at operation 2415, process 2400.

The type of management commands may include, but not limited to, restarting an Event Router 720, or instructing the Event Router 720, to load a new binary execution instruction file 845, or to load a new router configuration file 1260.

Domain Registry 740

Structural Overview

In an embodiment, the Domain Registry 740 is implemented to store the Domain name and version and the set of Domain attributes and their associated data types in a distributed store with central access for later retrieval or updates. The Domain Registry 740 is implemented to make this information available to all participating subsystems upon request, as shown in FIG. 7.

A Domain represents a named set of attributes, where each attribute includes a defined name and an associated data type. A Domain has a name and version associated with it. A domain relates to at least one of: a specific topic, a sphere of knowledge, an area of interest, a concept, and the like. For example, if the domain of interest is directed to monitoring temperature of a process, then, a domain definition named 'CookingTemperature', for capturing real-time temperature probe data may include the named attributes:

ProbeID

InternalTemperature

ExternalTemperature

BatteryLevel

SignalStrength

This is logically represented in FIG. 25.

The following domain schema definition for the Domain name of "CookingTemperature" with version "V1", is expressed in the domain schema definition syntax, and managed by the Domain Registry 740.

```
1.  domain CookingTemperature#V1 {
2.
3.      schema TemperatureProbe {
4.          attribute ProbeID {
5.              type = string;
6.              label = "Probe";
7.          }
8.          attribute InternalTemperature {
9.              type = double;
10.             label = "Internal Temperature";
11.             format = "0.00 F";
12.         }
13.         attribute ExternalTemperature {
14.             type = double;
15.             label = "External Temperature";
16.             format = "0.00 F";
17.         }
18.         attribute BatteryLevel {
19.             type = double;
20.             label = "Battery Level";
21.             format = "00%";
22.         }
23.         attribute SignalStrength {
24.             type = double;
25.             label = "Signal Strength";
26.         }
```

-continued

```
27.      }
28. }
29.
```

In an embodiment, the Domain Registry 740 manages Domain Schema storage, retrieval, and access control. The Domain Registry 740 provides an access point to request a domain definition. Event sources as well as event sinks can access the same domain definition thereby eliminating the possibility of misaligned domain attributes and their associated data types.

Functional Overview

FIG. 26 is a block diagram depicting an embodiment of a Domain Registry 740 implemented to register domain definitions and provide the domain definitions to other processes, such as those shown in FIG. 7, in accordance with an embodiment of the present disclosure. In an embodiment, Domain Registry 740 includes Access Control 2605, Domain Schema Retriever 2610, Domain Schema Registrar 2615, Domain Catalog 2620, and Management Interface 2625. The Domain Registry 740 is a single authoritative source for domain definitions across participating Event Routers 720 and solves the problem that a traditional publish/subscribe broker suffers from, namely, keeping domain definitions changes synchronized between sending and receiving Event Routers 720. There is a single domain schema definition managed by Domain Registry 740, whereas in a publish/subscribe broker model, each subscriber must implement a schema definition.

In an embodiment, the Domain Registry is responsible for at least one of: accepting domain definitions, retrieving domain definitions, providing permanent storage for domain definitions, enforcing access controls on who can store, modify, and retrieve domain definitions, and provide programmatic access to features of the Domain Registry 740 to enable programmatic control of domain definition, storage, retrieval, and access control over the domain definitions.

In an embodiment, Domain Schema Registrar (i.e., a Registrar) 2615 subcomponent is implemented to accept a domain schema definition via the Management Interface 2625 or via an endpoint, to validate that it is syntactically correct, interact with subcomponent Access Control 2605 to provide access control parameters for the domain schema definition and interact with subcomponent Domain Catalog 2620 to store the definitions in a permanent catalog of domain definitions.

In an embodiment, a Domain Schema Retriever 2610 subcomponent is implemented to provide external system access to domain schema definition upon request, interacting with Access Control 2605 and Domain Catalog 2620 subcomponents. In an embodiment, the Event Router Domain Rules Language Compiler 710, may query the Domain Schema Retriever 2610 for a schema definition during the compilation of a rules file 810. The Domain Schema Retriever 2610 interacts with subcomponent Access Control 2605, to determine if the requestor is permitted to receive the domain definition.

In an embodiment, the Domain Catalog 2620 subcomponent is implemented to store domain definitions in permanent storage for later retrieval. The Domain Catalog 2620 stores a domain definition upon request from the subcomponent of the Domain Schema Registrar 2615 and retrieves a domain definition upon request from the Domain Schema Retriever 2610.

In an embodiment, the Access Control 2605 subcomponent is implemented to provide role-based Access Controls for a given domain schema definition. defining roles for who can create, alter, delete, and access domain definitions. It is implemented to provide Access Control over schema fields. The Access Control 2605 subcomponent interacts with subcomponent Domain Schema Retriever 2610, to determine if a retrieval request is permitted.

In an embodiment, the Management Interface 2625 subcomponent is implemented to provide an application programming interface (API) for external systems to issue command to the Domain Registry 740. Commands supported by the Management Interface 2625 include but is not limited to: store and retrieve domain definitions, define, and modify access control roles, it may also provide a list of domain schema definitions upon request.

Process Overview

Figure 27:
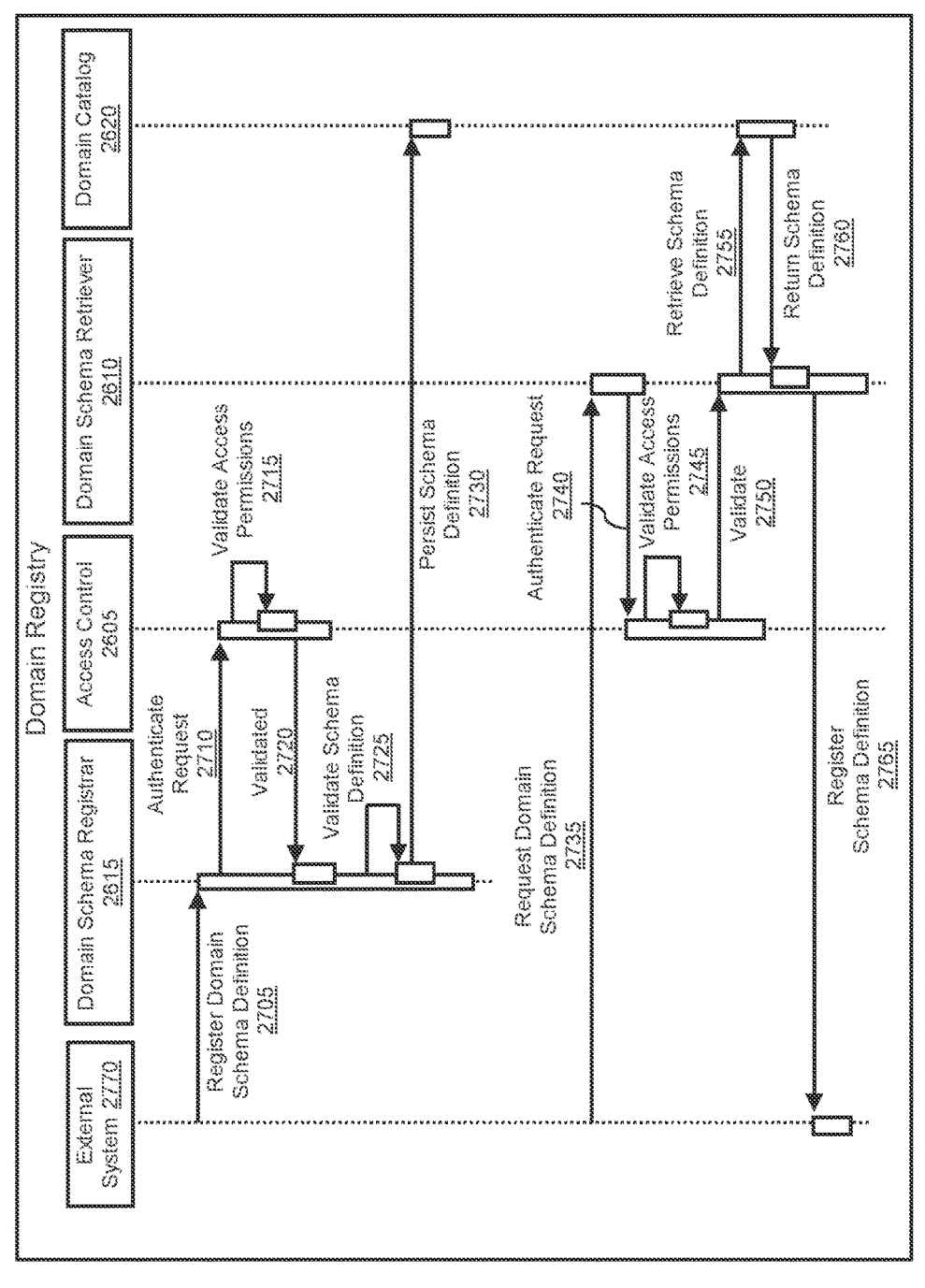
FIG. 27, illustrates an exemplary sequence diagram of the actions and execution flows of the subcomponents within an embodied domain registry and an external system, in accordance with an embodiment of the present disclosure.

FIG. 27, process 2700, illustrates an exemplary sequence diagram of the actions and execution flows of the subcomponents within an embodied Domain Registry 740. Operations 2705 and 2735 of process 2700 are asynchronous and can happen at any time and independent of one another. It is conceivable that a request for a Domain Schema could occur before it is persisted.

At operation 2705, process 2700, an external system makes a request of the Domain Schema Registrar 2615 to persist a new schema, or to persist a modified schema definition.

At operation 2710, process 2700, The Domain Schema Registrar 2615 initiates a request to Access Control 2605 to validate the request, to determine if the external system is permitted to persist the schema definition.

At operation 2715, process 2700, Access Control 2605 validates the request and at operation 2720 returns a validated message back to the Domain Schema Registrar 2615.

At operation 2725, process 2700, the Domain Schema Registrar 2715 will perform validation checks to ensure that the schema definition is valid and that it conforms to the rules governing a valid schema definition.

At operation 2730, process 2700, the Domain Schema Registrar 2615 will make a request of the Domain Catalog 2620 to persist the domain schema definition.

At operation 2735, process 2700, an external system makes a request to the Domain Schema Retriever 2610 to retrieve a schema definition.

At operation 2740, process 2700, the Domain Schema Retriever 2610, makes a request to Access Control 2605 to validate the request.

At operation 2745, process 2700, Access Control 2605, validates whether the request to retrieve a schema definition is permitted.

At operation 2750, process 2700, Access Control 2605 upon successful validation will return a validated message to the Domain Schema Retriever 2610.

At operation 2755, process 2700, the Domain Schema Retriever 2610 makes a request to the Domain Catalog 2620 to retrieve the requested schema definition. At operation 2760, the Domain Catalog 2620 returns the requested schema definition to the Domain Schema Retriever 2610.

At operation 2765, process 2700, the Domain Schema Retriever 2610 return the schema definition to the external system that made the request.

Domain Endpoint Resolver 750

Structural Overview

In an embodiment, the Domain Endpoint Resolver 750 is a process that has the same lifespan as an associated Event Router 720, there is therefore a one to one or a one-to-many relationships between the Domain Endpoint Resolver 750 and an embodied Event Router 720. In an embodiment and Event Router 720 may have zero or one Domain Endpoint Resolver 750 associated with it. Every event sink may also have zero or one Domain Endpoint Resolver 750 associated with it.

Figure 28A:
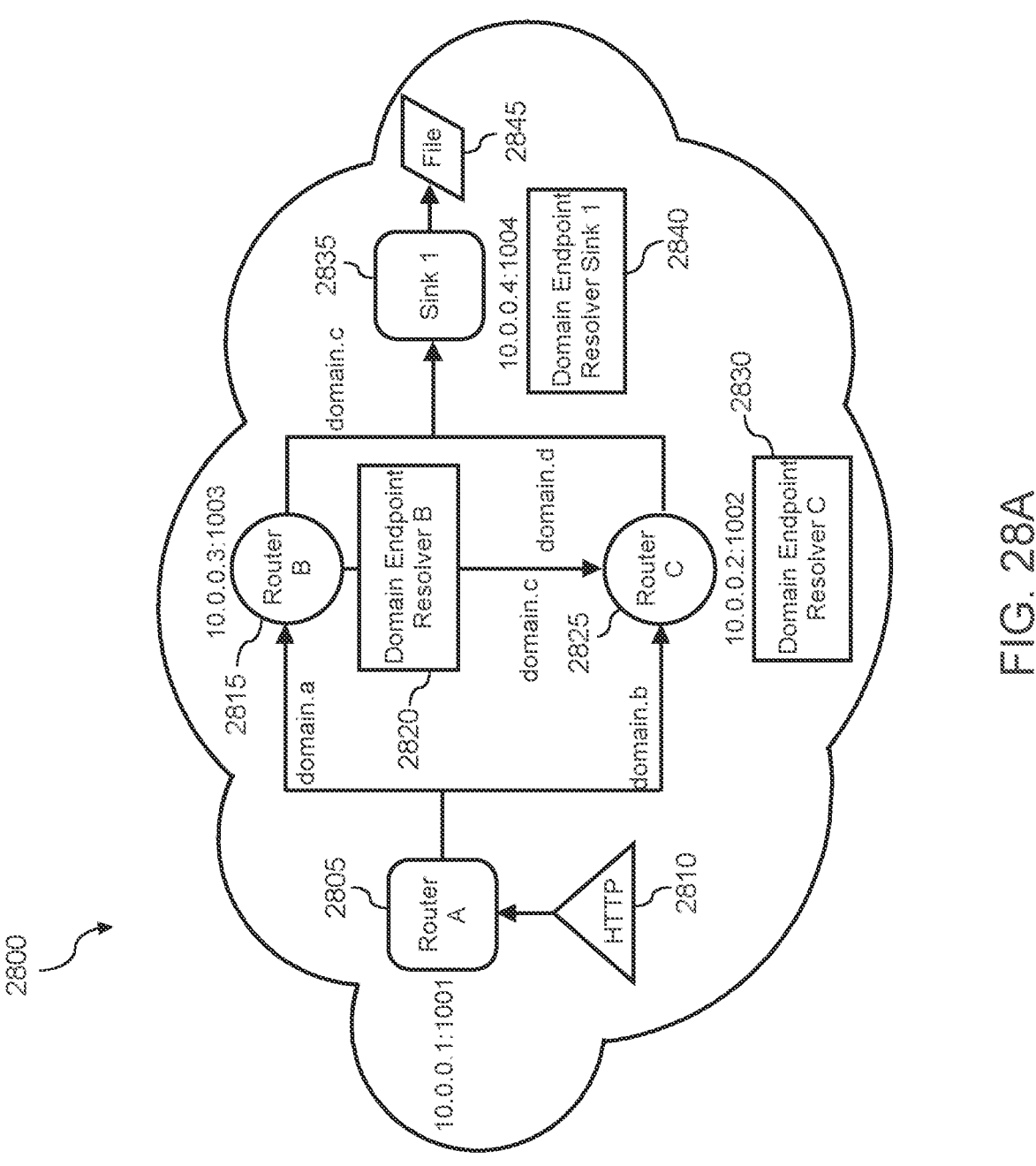

In a network of Event Routers 720 or Event Sink processes as depicted in FIGS. 28A and 28B, the purpose of an embodied Domain Endpoint Resolver 750 is to build an internal Domain/IP address table or Endpoint Table 2920 of every Event Router 720 and event sink in a defined network, and to, upon the request from the Event Router 720 resolve the domain name for an IP address and port. In an embodiment the Domain Endpoint Resolver's 750 function is to resolve the IP address for a given domain, when requested to do so by an Event Router 720.

The Domain Endpoint Resolver 750 makes it possible for an Event Router 720 to emit events to any other Event Router 720 in a network of event routers and event sinks for which they are configured to receive events for.

In an embodiment, every Event Router 720 or event sink has zero or one Domain Endpoint Resolver 750 associated with it. If there is no Domain Endpoint Resolver 750 for an associated Event Router, then the IP address and port of the destination endpoint must be manually configured in the Router Configuration File 1260.

In an embodiment, the Domain Endpoint Resolver 750 is the basis for establishing routing information, that is dynamically adjusted as and when Event Router 720 and event sinks establish a network of connected processes.

Functional Overview

FIG. 29 is a block diagram depicting an embodiment of a Domain Endpoint Resolver implemented to provide access control and Event Router 720 discovery capabilities within and across networks, such as those shown in FIGS. 28A and 28B, in accordance with an embodiment of the present disclosure. Referring to FIG. 29, Domain Endpoint Resolver 750 may include Access Control 2905, Endpoint Resolver 2910, Endpoint Registrar 2915, Endpoint Table 2920, and Management Interface 2925.

In an embodiment, the Access Control 2905 component determines what an Event Router 720 is permissioned to request. The access control list may be provided to the Access Control 2905 component by means of the Management Interface 2925 component.

In an embodiment, the Endpoint Registrar 2915 is implemented to store the domain names, the IP address(es) and port(s) of the associated Event Router(s) 720 and event sinks in the Endpoint Table 2920. The Domain Endpoint Resolver 750 is implemented to provide the ability for Event Routers 720 configured to route Event Data 3100 across disparate public and/or private networks.

In an embodiment, the Endpoint Resolver 2910 is responsible for providing an IP Address and port for a given domain name upon request from the associated Event Router 720. The Endpoint Resolver 2910 will determine if it is permitted to provide the IP Address and port based upon the Access Control 2905 permissions for that Event Router and domain name. In an embodiment, the Endpoint Table 2920 is responsible for storing and retrieval of IP Address(es), port(s), and domain names. FIGS. 28A and 28B depict a network of one source router 2805, two routers 2815, 2825 and one endpoint event sink 2835. In addition, an Endpoint Table 2920 that is maintained by every Domain Endpoint Resolver within the network.

In an embodiment, the Management Interface 2925 provides an application programmable interface (API) that may provide an access control list to the Access Control 2905 component, start, and stop the Domain Endpoint Resolver 750 and all its subcomponents but is not limited to these capabilities.

The Endpoint Table 2920 for every Domain Endpoint Resolver 750 in a network, as depicted in FIGS. 28A and 28B will contain all the IP Addresses and Ports for all domains in the network. This makes it possible to create a network topology map of Event Routers 720 in a network. Creating such a topology with the traditional Publisher/Subscribe architectural pattern is not possible. The Management Interface 2925 may upon request and Access Control 2905 permitting, return the Endpoint Table 2920 from an embodied Domain Endpoint Resolver 750, from which a router topology map could be constructed.

Process Overview

Figure 30:
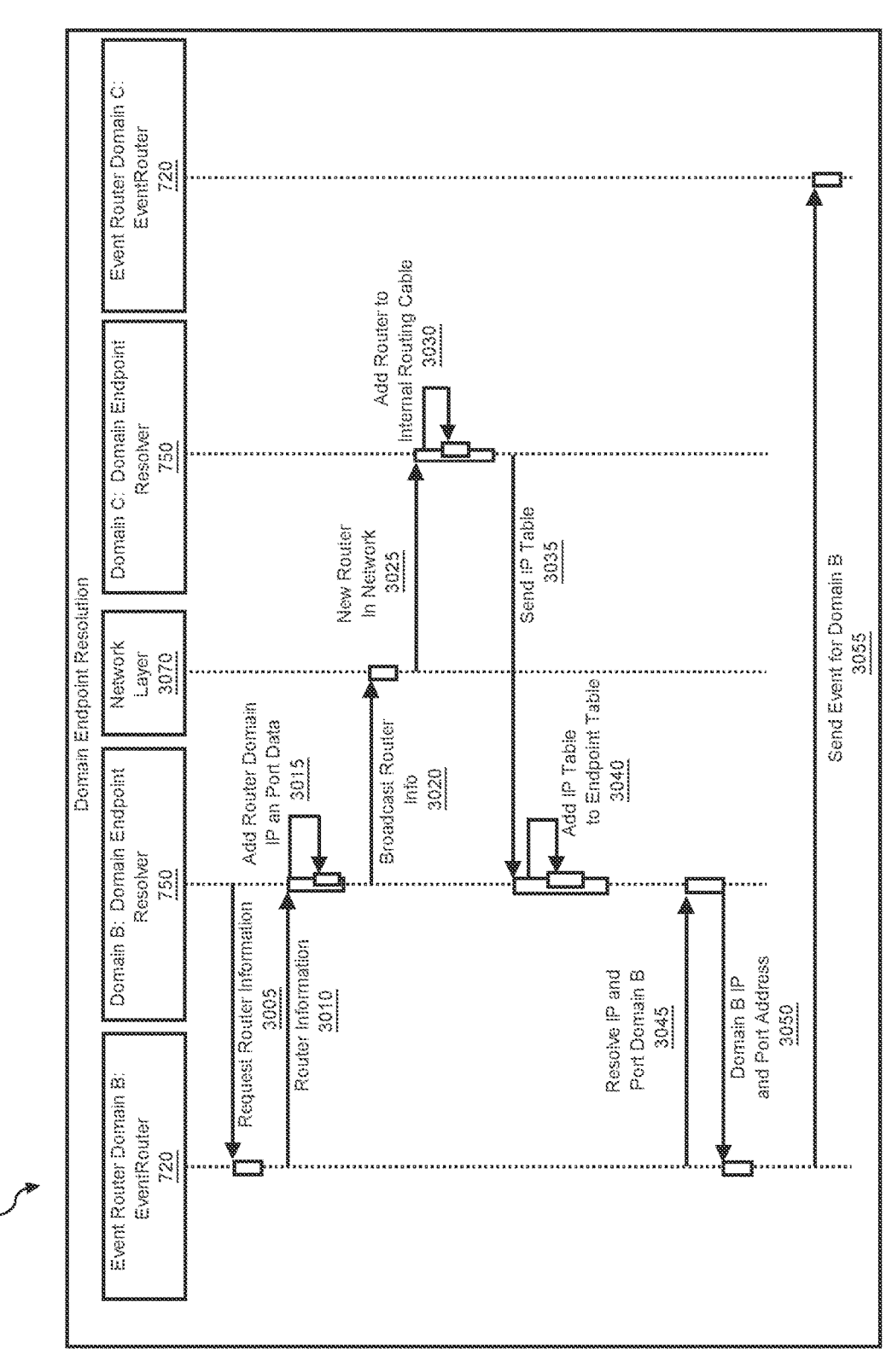
FIG. 30 illustrates an exemplary sequence diagram of the actions and execution flows of a domain endpoint resolver interacting with another domain endpoint resolver within a network of routers as well as the interaction between the event router, and its associated domain endpoint resolver, in accordance with an embodiment of the present disclosure.

FIG. 30, process 3000, illustrates an exemplary sequence diagram of the actions and execution flows of an embodied Domain Endpoint Resolver 750 interacting with another embodied Domain Endpoint Resolver 750 as well as the interaction between the Event Router 720, and its associated Domain Endpoint Resolver 750.

At operation 3005, process 3000, when a Domain Endpoint Resolver 750 start up, the Endpoint Registrar 2915 will request the Event Router's 720 IP Address(es) and Port(s) as well as all the Domain names for which it's associated Event Router 720 is configured to receive quadruple event messages 3100 for.

At operation 3010, process 3000, depicts a successful request from the Domain Endpoint Resolver 750 to obtain Event Router 720 information.

At operation 3015, process 3000, the Endpoint Registrar 2915 of the Domain Endpoint Resolver 750 will add the domain names and Event Router 720 IP address(es) and port(s) to the Endpoint Table 2920.

At operation 3020, process 3000, the Endpoint Registrar 2915 will broadcast the router information obtained at operation 3010 to all other Domain Endpoint Resolvers 750 that may be in the network.

At operation 3025, process 3000, a Domain Endpoint Resolver 750 can receive an asynchronous "New Router in Network" notification. Upon such a notification at operation 3030, process 2000, the Endpoint Registrar 2915 adds the new event router information (Domain names, IP Address(es) and Port(s)) to the Endpoint Table 2920.

At operation 3035, process 3000, the Endpoint Registrar sends the content of its Endpoint Table to the originating Domain Endpoint Resolver 750.

At operation 3040, process 3000, the Endpoint Registrar 2915 receives the IP Table of Endpoint Table 2920 from another Domain Endpoint Resolver 750, it updates its own internal Endpoint Table 2920 with this information. At this stage in the process all Domain Endpoint Resolvers 750 in the network will contain the same information in their Endpoint Tables 2920 as depicted in FIG. 28B.

At operation 3045, process 3000, when an Event Router 720, makes a request of the Endpoint Resolver 2910, to resolve a domain name, the Endpoint Resolver 2910 will do a lookup of the domain name in the Endpoint Table 2920 to obtain the associated IP Address(es) and Port(s) for the given domain name.

At operation 3050, process 3000, the Endpoint Resolver 2910 returns the IP Address(es) and Port(s) for the given domain name to its associated Event Router 720.

Operation 3055, process 3000, is an exemplary depiction on an Event Router 720 sending an event message to another Event Router 700, after it resolved the domain name for the target Event Router 720 domain.

The Event Router 720 avoids the need for a centralized message broker, as the Event Router 720 favors a point-to-point approach by leveraging the Domain Endpoint Resolver 750 to establish the point-to-point link. The Event Router 720 acts as an event processor and router, receives incoming Event Data 3100 from external systems, evaluates the event data, potentially normalizing, validating, and/or transforming events, before routing them to custom or standard integration endpoints for consuming processes, and/or other routers endpoints, based upon specified rules.

Given the point-to-point approach between Event Router 700 and event sinks, the Event Router 720 is deployed and executed in different networked computing environments. An Event Router 720 can be embedded in IoT devices, appliances, hardware routers, hardware servers in a data center, in virtual machines executing in cloud infrastructure, or virtualized edge compute. Combining the capabilities of the traditional Event Publisher, Event Broker and Event Subscriber into a single Event Router 720 makes it possible to embed an Event Router into different hardware and software levels of abstraction. Making it possible to receive event data, make localized decisions. This is not always possible with traditional message broker architectures.

Event Data 3100

Structural Overview

Figure 31:
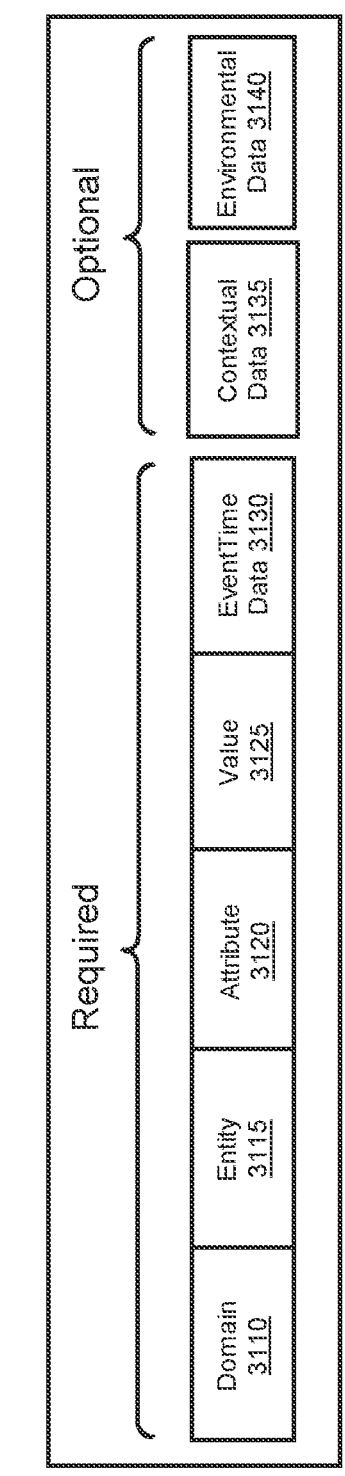
FIG. 31 is an exemplary view of an event data structure implemented to route event data to different domains, based upon the values of domains, entities, and attributes, in accordance with an embodiment of the present disclosure.

In an embodiment, the Event Data 3100 ingested and emitted from Event Router 720 is shown in FIG. 31. An incoming Event Router 720 event includes at least a Domain 3110, an Entity 3115, an Attribute 3120, a Value 3125, and an event Timestamp 3130, where the values for the Domain 3110, the Entity 3115 and the Attribute 3120 are textual, the Value 3125 is a numeric, text, boolean, date or binary data type and the event timestamp represents the date and time type.

In an embodiment, the values within the quadruple event structure of (Domain, Entity, Attribute, Value) form the minimal but not exclusive basis for the routing rules, which makes it possible to route an event based on the values of the Domain 3110, the Entity 3115, the Attribute 3120, and the Value 3125. In another embodiment it could be envisaged that the quadruple event message structure could be extended to include additional elements to form a n-tuple event structure.

Functional View

The Event Router 720 utilizes a defined event structure 3100 that standardizes the structure, and data types of event messages making it a consistent and version tolerant basis of routing, filtering, and transformational logic to be applied to the values of such an event structure. In an embodiment, the event structure 3100 elements are treated as run-time constants, which serve as the basis for event routing and transformation rules. The Event Router 720 directly routes to another Event Router 720, thereby forming a localized network of event flows, such as shown in FIGS. 28A and 28B. Such a network of event flows could mimic business or logistic flows to deliver on business value.

Disclosure Postscript

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all the acts need to be necessarily performed. Also, those acts that are not dependent on other acts may be performed in parallel with the other acts. The scope of embodiments is by no means limited by these specific examples.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An event-based routing system, the system comprising:
an Event Router Domain Rules Language Compiler comprising a lexical scanner, a parser, a symbol table, an abstract syntax tree generator, a type checker, and a code generator, the Event Router Domain Rules Language Compiler configured to parse and compile a Domain Event Router rules file into Event Router rules instructions;
an Event Router configured to ingest incoming event data and apply the Event Router rules instructions;
an Event Router Management component comprising a management interface that provides an application programmable interface for management commands, the Event Router Management component configured to manage the Event Router, wherein the Event Router includes a single Event Router or a network of multiple Event Routers;
a Domain Registry configured to register domain definitions and provide the domain definitions to the Event Router Domain Rules Language Compiler and a Domain Endpoint Resolver; and
the Domain Endpoint Resolver comprising an endpoint registrar and an endpoint table, the Domain Endpoint Resolver configured to store IP addresses, ports, and names of domains for which the Event Router receives event data, and the domain names of the Event Routers, wherein the event data has an event message format comprising a tuple of at least: a Domain, an Entity, an Attribute, and a Value.

2. The system of claim 1, wherein the Event Router Domain Rules Language Compiler is further configured to:
read an Event Router domain rules file;
convert the rules file into a series of tokens that signify their lexical scope;
parse the series of tokens to determine whether the tokens conform to a sentence structure of an underlying grammar;
populate a symbol table with identifiers and variables in the Event Router domain rules file to construct an abstract syntax tree;
perform type checking on data types to ensure that data types and their associated operations are compatible; and
generate an executable binary domain Event Router rules instructions.

3. The system of claim 2, wherein the executable domain and rules specifications determine how events are normalized, transformed, and routed.

4. The system of claim 2, wherein the incoming event data further includes at least one of: contextual data and environmental data.

5. The system of claim 1, wherein the Event Router is further configured to emit event data.

6. The system of claim 1, wherein the Event Router is configured based upon a configuration file.

7. The system of claim 6, wherein the Event Router is configured to only accept incoming event data and emit event data.

8. The system of claim 6, wherein the Event Router is configured to launch ingress plugins to obtain data from external systems and convert the external data to event data for consumption by the Event Router.

9. The system of claim 6, wherein the Event Router is configured to launch egress plugins to convert outgoing event data and route the converted outgoing event data to a plugin for dispatch to external systems.

10. The system of claim 1, wherein the Event Router functions as a router spanning a public or private network.

11. The system of claim 1, wherein the Event Router Management component is configured to at least one of:

start the Event Router, stop the Event Router, and deploy router instructions to the Event Router.

12. The system of claim 1, wherein the Domain Registry includes: an Access Control, a Domain Schema Retriever, a Domain Schema Registrar, a Domain Catalog, and a Management Interface.

13. The system of claim 1, wherein the Domain Registry is a single authoritative source for domain definitions across participating Event Routers.

14. The system of claim 1, wherein a single domain schema definition is managed by the Domain Registry.

15. The system of claim 1, wherein the Domain Registry is configured for at least one of: accepting domain definitions, retrieving domain definitions, providing permanent storage for domain definitions, enforcing access controls, modifying, and retrieving domain definitions, providing programmatic access and control of domain definition, storage, retrieval.

16. A method for event-based routing, the method comprising:

parsing and compiling, by an Event Router Domain Rules Language Compiler, a domain Event Router rules file into Event Router rules instructions;

ingesting, by an Event Router, incoming event data and applying the Event Router rules instructions;

managing, by an Event Router Management component, the Event Router, wherein the Event Router includes a single Event Router or a network of multiple Event Routers;

registering, by a Domain Registry, domain definitions and providing the domain definitions to the Event Router Domain Rules Language Compiler and a Domain Endpoint Resolver; and storing, by the Endpoint Resolver, IP addresses, ports, and names of domains for which the Event Router receives event data, and the domain names of the Event Routers, wherein the event data has an event message format comprising a tuple of at least: a Domain, an Entity, an Attribute, and a Value.

17. The method of claim 16, wherein parsing and compiling the domain Event Router rules file comprises: reading an Event Router domain rules file, converting the rules file into a series of tokens that signify their lexical scope, parsing the series of tokens and determining whether the tokens conform to a sentence structure of an underlying grammar, populating a symbol table with identifiers and variables in the Event Router domain rules file and construct an abstract syntax tree, performing type checking on data types to ensure that data types and their associated operations are compatible, and generating the executable binary domain Event Router rules instructions.

18. The method of claim 17, wherein the executable domain and rules specifications determine how events are normalized, transformed, and routed.

19. The method of claim 16, wherein the incoming event data further includes at least one of: contextual data and environmental data.

20. The method of claim 16, further comprising configuring the Event Router to emit event data.

21. The method of claim 16, further comprising configuring the Event Router based on a configuration file.

22. The method of claim 21, wherein configuring the Event Router includes configuring the Event Router to only accept incoming event data and emit event data.

23. The method of claim 21, wherein configuring the Event Router includes configuring the Event Router to launch ingress plugins to obtain data from external systems and convert the external data to event data for consumption by the Event Router.

24. The method of claim 21, wherein configuring the Event Router includes configuring the Event Router to launch egress plugins to convert outgoing event data and to route the converted outgoing event data to a plugin for dispatch to external systems.

25. The method of claim 16, further comprising configuring the Event Router to function as a router spanning a public or private network.

26. The method of claim 16, wherein managing a single or a network of routers includes at least one of: starting the Event Router, stopping the Event Router, and deploying router instructions to the Event Router.

27. The method of claim 16, wherein the Domain Registry includes: an Access Control, a Domain Schema Retriever, a Domain Schema Registrar, a Domain Catalog, and a Management Interface.

28. The method of claim 16, wherein the Domain Registry is a single authoritative source for domain definitions across participating Event Routers.

29. The method of claim 16, wherein managing a single Event Router or a network of multiple Event Routers includes managing a single domain schema definition by the Domain Registry.

30. The method of claim 16, further comprising, by the Domain Registry, at least one of: accepting domain definitions, retrieving domain definitions, providing permanent storage for domain definitions, enforcing access controls, modifying, and retrieving domain definitions, providing programmatic access and control of domain definition, storage, and retrieval.

31. The method of claim 16, further comprising, by the Domain Endpoint Resolver, routing event data across disparate public and/or private networks.

32. The method of claim 16, further comprising configuring two Event Routers as routers interacting with the Domain Endpoint Resolver to route event data across different networks.

* * * * *